(12) United States Patent
Tang

(10) Patent No.: US 11,418,951 B2
(45) Date of Patent: Aug. 16, 2022

(54) METHOD FOR IDENTIFYING ENCRYPTED DATA STREAM, DEVICE, STORAGE MEDIUM AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 297 days.

(21) Appl. No.: 16/849,865

(22) Filed: Apr. 15, 2020

(65) Prior Publication Data
US 2020/0245136 A1    Jul. 30, 2020

Related U.S. Application Data

(63) Continuation of application No. PCT/CN2018/085510, filed on May 3, 2018.

(30) Foreign Application Priority Data

Oct. 16, 2017 (WO) ................ PCT/CN2017/106349
Apr. 3, 2018 (WO) ................ PCT/CN2018/081774

(51) Int. Cl.
*H04W 12/00* (2021.01)
*H04W 12/06* (2021.01)
(Continued)

(52) U.S. Cl.
CPC ......... *H04W 12/033* (2021.01); *H04L 63/166* (2013.01); *H04W 12/06* (2013.01);
(Continued)

(58) Field of Classification Search
CPC ... H04W 12/033; H04W 12/06; H04W 76/12; H04W 76/25; H04W 76/30; H04W 80/02;
(Continued)

(56) References Cited

U.S. PATENT DOCUMENTS 6,948,060 B1 * 9/2005 Ramanathan ....... H04L 63/0428
 713/153
7,778,194 B1    8/2010 Yung
(Continued)

FOREIGN PATENT DOCUMENTS

CA    2818340 A1 * 12/2013 ......... H04L 63/0272
CN    101668016 A    3/2010
(Continued)

OTHER PUBLICATIONS

The EESR of corresponding European application No. 18869093.7, dated Sep. 7, 2020.
(Continued)

*Primary Examiner* — Eunsook Choi

(57) ABSTRACT

A method for identifying an encrypted data stream, a device, a readable storage medium and a system are provided. The method includes: receiving a data packet carrying authentication data which is sent by a user equipment (UE), where the authentication data includes a first authentication parameter, a first authentication result and an application identifier; obtaining, based on the first authentication parameter and a second authentication parameter, a second authentication result according to a set authentication algorithm, where the second authentication parameter is a pre-stored authentication parameter corresponding to the application identifier; establishing an association relationship between characteristic information of the data packet and the application identifier when the second authentication result is consistent with the first authentication result in comparison, where the association relationship is used for subsequently identifying
(Continued)

an encrypted data stream which is sent by the UE and corresponds to the application identifier.

19 Claims, 15 Drawing Sheets

(51) Int. Cl.
| | |
|---|---|
| *H04W 12/033* | (2021.01) |
| *H04W 76/12* | (2018.01) |
| *H04W 76/25* | (2018.01) |
| *H04W 76/30* | (2018.01) |
| *H04L 9/40* | (2022.01) |
| *H04W 80/02* | (2009.01) |
| *H04W 80/10* | (2009.01) |

(52) U.S. Cl.
CPC ........... *H04W 76/12* (2018.02); *H04W 76/25* (2018.02); *H04W 76/30* (2018.02); *H04W 80/02* (2013.01); *H04W 80/10* (2013.01)

(58) Field of Classification Search
CPC ...... H04W 80/10; H04L 63/166; H04L 63/20; H04L 63/0428
See application file for complete search history.

(56) References Cited

U.S. PATENT DOCUMENTS

| | | | |
|---|---|---|---|
| 10,305,862 B2 * | 5/2019 | Bone | H04L 63/0428 |
| 10,367,811 B2 * | 7/2019 | Clark | H04W 4/70 |
| 10,630,642 B2 * | 4/2020 | Clark | G06F 21/606 |
| 10,715,510 B2 * | 7/2020 | Ingale | H04L 63/06 |
| 11,240,218 B2 * | 2/2022 | Wu | H04L 63/0869 |
| 2005/0210234 A1 | 9/2005 | Best et al. | |
| 2007/0260871 A1 | 11/2007 | Paya et al. | |
| 2008/0307518 A1* | 12/2008 | Holtmanns | H04L 63/12 726/12 |
| 2016/0234177 A1* | 8/2016 | Bone | H04W 52/0229 |
| 2016/0262021 A1 | 9/2016 | Lee et al. | |
| 2017/0126564 A1 | 5/2017 | Mayya et al. | |
| 2018/0048674 A1* | 2/2018 | Black | H04L 63/02 |
| 2019/0109821 A1* | 4/2019 | Clark | H04L 63/0414 |
| 2019/0109848 A1* | 4/2019 | Clark | H04L 9/3228 |

FOREIGN PATENT DOCUMENTS

| | | | | |
|---|---|---|---|---|
| CN | 101714952 A | 5/2010 | | |
| CN | 102111263 A | 6/2011 | | |
| CN | 102137022 A | 7/2011 | | |
| CN | 102893695 A | 1/2013 | | |
| CN | 103414709 A | 11/2013 | | |
| CN | 103428643 A | 12/2013 | | |
| CN | 103596166 A | 2/2014 | | |
| CN | 104038389 A | 9/2014 | | |
| CN | 105099930 A | 11/2015 | | |
| CN | 105592449 A | 5/2016 | | |
| CN | 105915396 A | 8/2016 | | |
| CN | 106209775 A | 12/2016 | | |
| EP | 2890073 A1 * | 7/2015 | ......... | H04L 63/0428 |
| KR | 20160084127 A | 7/2016 | | |
| WO | WO-2014193278 A1 * | 12/2014 | ......... | H04L 61/6059 |

OTHER PUBLICATIONS

The second Office Action of corresponding Chinese application No. 201880038900.1, dated Sep. 10, 2019.
The Notice of Allowance of corresponding Chinese application No. 201780091924.9, dated Oct. 12, 2020.
International Search Report (ISR) dated Jul. 12, 2018 for Application No. PCT/CN2018/085510.
International Search Report (ISR) dated Jun. 25, 2018 for Application No. PCT/CN2018/081774.
International Search Report (ISR) dated May 30, 2018 for Application No. PCT/CN2017/106349.
The First Office Action of corresponding Chinese application No. 201880038900.1, dated Jun. 4, 2020.
The First Office Action of corresponding Chinese application No. 201780091924.9, dated May 28, 2020.
The Second Office Action of corresponding Chinese application No. 201780091924.9, dated Aug. 13, 2020.
OPPO, S2-184009; Solution for UE assisted encrypted traffic detection, published on Apr. 20, 2018.
OPPO, S2-180376; Solution for UE assisted encrypted traffic detection, published on Jan. 26, 2018.
OPPO, S2-181974; Solution for UE assisted encrypted traffic detection, published on Mar. 2, 2020.
OPPO, S2-183209; Solution for UE assisted encrypted traffic detection, published on Apr. 20, 2018.

* cited by examiner

METHOD FOR IDENTIFYING ENCRYPTED DATA STREAM, DEVICE, STORAGE MEDIUM AND SYSTEM

CROSS-REFERENCE TO RELATED APPLICATION

This application is a continuation of International Application No. PCT/CN2018/085510, filed on May 3, 2018, which based on, and claims priority to, PCT International Application whose International Application Number is PCT/CN2017/106349 and International Filing Date is Oct. 16, 2017, and PCT International Application whose International Application Number PCT/CN2018/081774 and International Filing Date is Apr. 3, 2018. The content of the above PCT international Applications is incorporated herein by reference in their entireties.

TECHNICAL FIELD

Embodiments of the present disclosure relate to the field of network security technologies and, in particular to a method for identifying an encrypted data stream, a device, a readable storage medium and a system.

BACKGROUND

After the version 2.0 of the hypertext transfer protocol (HTTP) appears, all data streams of the HTTP layer and the application layer above the HTTP layer can be encrypted by a transport layer security protocol (TLS), but network devices provided by operators cannot identify the encrypted data streams.

To solve this problem, at present, some plaintext identifiers of the TLS layer are usually adopted to identify the encrypted data streams of applications in a handshake process of the TLS protocol. However, since the plaintext identifiers are easy to be broken, there is a hidden danger of insecurity, and the subsequent TLS protocols no longer support the plaintext identifiers. Based on this, no solution or mechanism for identifying the encrypted data stream without relying on the plaintext identifiers is proposed in the related art.

SUMMARY

To solve the foregoing technical problem, embodiments of the present disclosure desirably provide a method for identifying an encrypted data stream, a device, a readable storage medium and a system, which can identify the encrypted data stream without relying on a plaintext identifier, thereby improving the identification safety.

The technical solutions of the embodiments of the present disclosure can be realized as follows.

In a first aspect, an embodiment of the present disclosure provides a method for identifying an encrypted data stream, where the method is applied to a core network device, and the method includes:

receiving a data packet carrying authentication data sent by a user equipment (UE); where the authentication data includes a first authentication parameter, a first authentication result and an application identifier;

obtaining, based on the first authentication parameter and a second authentication parameter, a second authentication result according to a set authentication algorithm; where the second authentication parameter is a pre-stored authentication parameter corresponding to the application identifier; and establishing an association relationship between characteristic information of the data packet and the application identifier when the second authentication result is consistent with the first authentication result in comparison; where the association relationship is used for subsequently identifying an encrypted data stream which is sent by the UE and corresponds to the application identifier.

In a second aspect, an embodiment of the present disclosure provides a method for identifying an encrypted data stream, where the method is applied to a user equipment (UE), and the method includes:

sending a data packet carrying authentication data; where the authentication data is used for a core network device to perform authentication, and the authentication data includes: a first authentication parameter, a first authentication result and an application identifier.

In a third aspect, an embodiment of the present disclosure provides a core network device, including: a first receiving part, an authenticating part and an establishing part; where, the first receiving part is configured to receive a data packet carrying authentication data sent by a user equipment (UE); where the authentication data includes a first authentication parameter, a first authentication result and an application identifier;

the authenticating part is configured to obtain, based on the first authentication parameter and a second authentication parameter, a second authentication result according to a set authentication algorithm; where the second authentication parameter is a pre-stored authentication parameter corresponding to the application identifier; and the establishing part is configured to establish an association relationship between characteristic information of the data packet and the application identifier when the second authentication result is consistent with the first authentication result in comparison; where the association relationship is used for subsequently identifying an encrypted data stream which is sent by the UE and corresponds to the application identifier.

In a fourth aspect, an embodiment of the present disclosure provides a user equipment (UE), where the UE includes: a second sending part, configured to send a data packet carrying authentication data; where the authentication data is used for a core network device to perform authentication, and the authentication data includes: a first authentication parameter, a first authentication result and an application identifier.

In a fifth aspect, an embodiment of the present disclosure provides a core network device, including: a first network interface, a first memory, and a first processor; where, the first network interface is configured to receive and send signals in a process of receiving and sending information with other external network elements;

the first memory is configured to store a computer program operable on the first processor; and the first processor is configured to perform steps of the method of the first aspect when running the computer program.

In a sixth aspect, an embodiment of the present disclosure provides a user equipment (UE), where the UE includes: a second network interface, a second memory, and a second processor;

where the second network interface is configured to receive and send signals in a process of receiving and sending information with other external network elements;

the second memory is configured to store a computer program operable on the second processor; and the second processor is configured to perform steps of the method of the second aspect when running the computer program.

In a seventh aspect, an embodiment of the present disclosure provides a computer readable medium, having a program for identifying an encrypted data stream stored thereon, where the program for identifying an encrypted data stream implements steps of the method of the first aspect or the second aspect when executed by at least one processor.

In an eighth aspect, an embodiment of the present disclosure provides a system for identifying an encrypted traffic, including a core network device and a user equipment (UE), where, the UE is configured to send a data packet carrying authentication data; where the authentication data is used for the core network device to perform authentication, and the authentication data includes: a first authentication parameter, a first authentication result and an application identifier;

the core network device is configured to receive the data packet carrying the authentication data sent by the UE;

obtain, based on the first authentication parameter and a second authentication parameter, a second authentication result according to a set authentication algorithm; where the second authentication parameter is a pre-stored authentication parameter corresponding to the application identifier; and establish an association relationship between characteristic information of the data packet and the application identifier when the second authentication result is consistent with the first authentication result in comparison; where the association relationship is used for subsequently identifying an encrypted data stream which is sent by the UE and corresponds to the application identifier.

The embodiments of the present disclosure provide a method for identifying an encrypted data stream, a device, a readable storage medium and a system. The core network device performs authentication with the UE in the TLS handshake process of the UE and the OTT server or after the handshake is completed, and thus the association relationship for identifying the encrypted data stream is established to realize the detection and the statistics of the encrypted data stream. There is no need to rely on the plaintext identifier, and no complicated IP address configuration and maintenance are required, thereby improving the safety and reducing the computing resources required fir the configuration and maintenance.

DESCRIPTION OF EMBODIMENTS

In order to understand the features and technical contents of embodiments of the present disclosure in more detail, the implementation of the embodiments of the present disclosure will be described in detail below with reference to the drawings. The drawings are for reference only and are not intended to limit the embodiments of the present disclosure.

Currently, application level data is defined in the service and system aspects working group 2 (SA2) of the 3rd generation partnership project (3GPP) for identifying traffic of applications. Based on this, a third party OTT (Over The Top) service provider can actively initiate an operation of installing, updating or deleting an identification rule for application traffic to an operator network, so that the operator network has a capability of identifying a service. However, there is still no relevant mechanism for identifying encrypted data streams of the service.

Based on the above, following embodiments are proposed.

Embodiment 1

Figure 1:
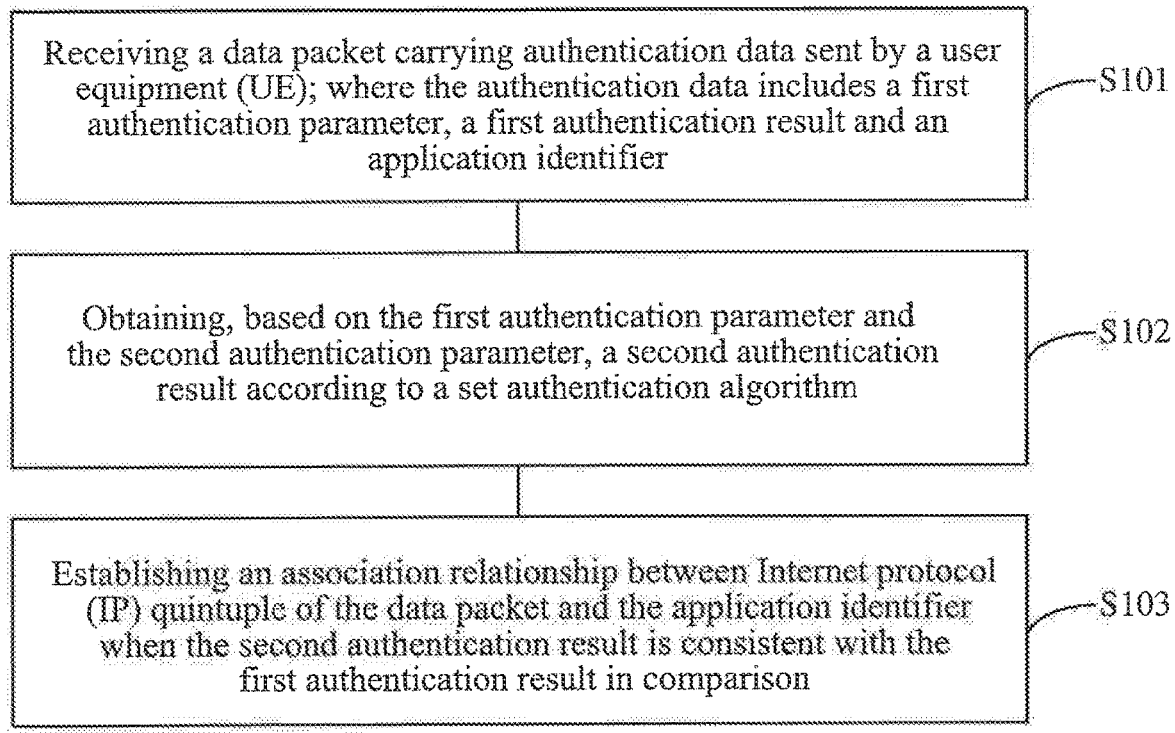
FIG. 1 is a schematic flow chart of a method for identifying an encrypted data stream according to an embodiment of the present disclosure.

Referring to FIG. 1, FIG. 1 shows a method for identifying an encrypted data stream according to an embodiment of the present disclosure. The method can be applied to a core network device, and it can be understood that the core network device of this embodiment includes two parts, namely a user plane and a control plane; therefore, the core network device of this embodiment may be a single entity device including two parts, i.e., the user plane and the control plane, or may be a logical network element device in a core network formed by two entities, i.e., the user plane and the control plane, which is not specifically limited in this embodiment. The method shown in FIG. 1 can include:

S101: receiving a data packet carrying authentication data sent by a user equipment (UE); where the authentication data includes a first authentication parameter, a first authentication result and an application identifier;

S102: obtaining, based on the first authentication parameter and a second authentication parameter, a second authentication result according to a set authentication algorithm;

where the second authentication parameter is a pre-stored authentication parameter corresponding to the application identifier. It can be understood that the second authentication parameter can be generated by an OTT server and pre-configured in the core network device; the first authentication parameter can also be generated by the OTT server and is pre-configured in the UE; and the set authentication algorithm can be statically pre-configured in the UE and the core network device.

S103: establishing an association relationship between characteristic information of the data packet and the application identifier when the second authentication result is consistent with the first authentication result in comparison.

The association relationship is used for subsequently identifying an encrypted data stream which is sent by the UE and corresponds to the application identifier. The characteristic information of the data packet can include at least one or more of: an Internet protocol (IP) source address, an IP source port number, an IP destination address, an IP destination port number, a media access control (MAC) source address, an IP source port number, a MAC destination address, a MAC destination port number, a protocol type, and a virtual local area network (VLAN) label.

By using the technical solution shown in FIG. 1, the core network device can identify the encrypted data stream of the application represented by the application identifier through the association relationship, so that the detection and statistics of the encrypted data stream are further realized. There is no need to rely on the plaintext identifier, and no complicated IP address configuration and maintenance are required, thereby improving the safety and reducing the computing resources required for the configuration and maintenance.

It will be appreciated that the characteristic information of the data packet may include layer-3 characteristics, i.e., the IP source address, the IP source port number, the IP destination address, the IP destination port number, the IP source port number, and may also include layer-2 characteristics, i.e., the media access control (MAC) source address, the MAC destination address, the MAC destination port number, the protocol type, and the virtual local area network (ULAN) label; the above association relationship is not only an association relationship between the layer-3 characteristics of the data packet and the application identifier, but may also be an association relationship between the layer-2 characteristics and the application identifier, which shows that when the data packet is transmitted through a non-IP data packet, the encrypted data stream of the application represented by the application identifier can still be identified through the association relationship.

As for the technical solution shown in FIG. 1, in a first possible implementation, the technical solution shown in FIG. 1 can be implemented in a process of establishing a TLS handshake between the UE and the OTT server, and therefore, the receiving a data packet carrying authentication data sent by a user equipment (UE) includes that:

a user plane of the core network device receives a first TLS handshake request sent by the UE in the TLS handshake process established by an application layer session; where the authentication data is carried in a plaintext field of the first TLS handshake request.

Specifically, for the above implementation, the UE can add a plaintext field in the first TLS handshake request, and add the authentication data to the added plaintext field.

Corresponding to the above implementation, after receiving the data packet carrying the authentication data sent by the user equipment (UE), the method further includes:

the user plane of the core network device transmits the authentication data to a control plane of the core network device after detecting the authentication data from the plaintext field of the first TLS handshake request.

It should be noted that after obtaining the authentication data, the control plane of the core network device can execute S102 of the solution shown in FIG. 1 according to the authentication data, and send a comparison result to the user plane of the core network device after comparing the second authentication result with the first authentication result, so that the user plane of the core network device determines whether to execute S103 according to the comparison result. It can be understood that the comparison result is ignored when the second authentication result is not consistent with the first authentication result.

As for the technical solution shown in FIG. 1, in a second possible implementation, the technical solution shown in FIG. 1 can be implemented after a TLS handshake is completed between the UE and the OTT server, and therefore, the receiving a data packet carrying authentication data sent by a user equipment (UE) includes that: after completing the TLS handshake, the user plane of the core network device receives an authentication request sent by the UE through a base station; where the authentication data is carried in an extended general packet radio service tunnelling protocol user plane (GTP-U) field of the authentication request.

Specifically, for the above implementation, the authentication request is initiated by the UE actively after the TLS handshake of the application layer is completed. The UE can can the authentication data in an extended packet data convergence protocol (PDCP) field to the base station side, and the base station side can convert the authentication data in the extended PDCP field into an extended GTP-U field and continue to send the extended GTP-U field to the user plane of the core network device.

Corresponding to the above implementation, after receiving the data packet the carrying authentication data sent by the user equipment (UE), the method further includes:

the user plane of the core network device transmits the authentication data to the control plane of the core network device after detecting the authentication data from the extended GTP-U field of the authentication request.

Similarly to the foregoing implementation, it should be noted that after obtaining the authentication data, the control plane of the core network device can execute S102 of the solution shown in FIG. 1 according to the authentication data, and send a comparison result to the user plane of the core network device after comparing the second authentication result with the first authentication result, so that the user plane of the core network device determines whether to execute S103 according to the comparison result. It can be understood that the comparison result is ignored when the second authentication result is inconsistent with the first authentication result.

For the above two implementations, in an example, the first authentication parameter includes a random number, and the second authentication parameter includes a public key Ka; or, the first authentication parameter includes a public key Ka, and the second authentication parameter includes a random number.

For the random number, it should be noted that the random number may be a random number generated based on a preset random-number generation policy; in addition, the random number may be a number that changes with the current time and/or the current location of the UE, so that each random number is different. For example, there is usually a correlation between the current location of the UE and the IP address of the UE, and the IP addresses of different UEs are correspondingly different. Therefore, the random number can be obtained as a combination of a current timestamp and the IP address of the UE, so that when at least one of the UE, the time and the location is different, the corresponding random number is different. The effect that each random number is different is achieved.

It can be understood that, in the embodiments of the present disclosure, the subsequent specific generation process of the random number can be implemented according to the above description, and details will not be described again.

For the above two implementations, in an example, the obtaining, based on the first authentication parameter and the second authentication parameter, a second authentication result according to a set authentication algorithm includes that:

the control plane of the core network device obtains, based on the first authentication parameter and the second authentication parameter, the second authentication result according to the set authentication algorithm.

For the above two implementations, in an example, the establishing an association relationship between characteristic information of the data packet and the application identifier when the second authentication result is consistent with the first authentication result in comparison includes:

the control plane of the core network device transmits the comparison result to the user plane of the core network when the second authentication result is consistent with the first authentication result in comparison; and the user plane of the core network device establishes the association relationship between the characteristic information of the data packet and the application identifier.

As for the technical solution shown in FIG. 1, in a third possible implementation, the technical solution shown in FIG. 1 can be implemented after the TLS handshake is completed between the UE and the OTT server, but this implementation is different from the second implementation in that the authentication request is directly sent to the control plane of the core network device by the UE, and therefore, the receiving a data packet carrying authentication data sent by a user equipment (UE) includes that:

the control plane of the core network device receives a non-access stratum session management NAS-SM message sent by the UE after the TLS handshake is completed.

An extended field of the NAS-SM message includes: a first authentication parameter, a first authentication result, an application identifier and characteristic information of the NAS-SM message; where the first authentication parameter includes: a random number and a public key Ka; the characteristic information of the NAS-SM message includes at least one or more of: an IP address of the OTT server, a port number, a protocol type, and a MAC address of the OTT server. It should be noted that Ka is an optional authentication parameter Ka may also be searched in a core network database by the core network device through the application identifier, and a correspondence between the application identifier in the core network database and Ka may be pre-configured in the database by a third-party server.

Corresponding to the above implementation, the obtaining, based on the first authentication parameter and the second authentication parameter, a second authentication result according to a set authentication algorithm includes that:

the control plane of the core network device obtains, based on the random number in the first authentication parameter and the public key in the second authentication parameter, the second authentication result according to the set authentication algorithm.

Corresponding to the above implementation, the establishing an association relationship between characteristic information of the data packet and the application identifier when the second authentication result is consistent with the first authentication result in comparison includes that:

when the second authentication result is consistent with the first authentication result in comparison, the control plane of the core network device generates the characteristic information of the data packet according to characteristic information of the OTT server and characteristic information of the UE, and transmits the generated characteristic information of the data packet and the application identifier to the user plane of the core network device; specifically, the characteristic information of the OTT server includes the IP address, the port number, the protocol type of the OTT server, and the MAC address of the OTT server; the characteristic information of the UE includes: an IP address, a port and a MAC address of the UE.

The user plane of the core network device establishes the association relationship between the generated characteristic information of the data packet and the application identifier.

For the technical solution shown in FIG. 1, after obtaining, based on the first authentication parameter and the second authentication parameter, the second authentication result according to the set authentication algorithm, the method further includes that:

the control plane of the core network device sends the comparison result of the second authentication result and the first authentication result to the UE through the user plane of the core network device.

It can be understood that, after receiving the comparison result, the UE can know whether the core network device completes the establishment of the association relationship, and thus determines whether to continue the authentication with the core network device.

In addition, for the technical solution shown in FIG. 1, after the establishment of the association relationship between the characteristic information of the data packet and the application identifier is completed, a life cycle can be set for the association relationship. Specifically, the technical solution shown in FIG. 1 can further include: receiving an effective time message sent by the UE; where the effective time message is used for indicating an effective duration of the association relationship for identifying the encrypted data stream. It can be understood that the effective duration can be used as the life cycle of the association relationship. Therefore, in an implementation, the method can further include: when the effective duration expires, releasing the association relationship if the transmission of the encrypted data stream is not completed, In addition, the association relationship can also be released through an indication from the UE, and based on this, the life cycle, i.e. the effective duration, may not need to be considered, and in an implementation, the method further includes:

receiving, within the effective duration or after the effective duration expires, a release indication message sent by the UE; and releasing the association relationship based on the release indication message.

It should be noted that both the effective time message and the release indication message can be both sent through a NAS message.

This embodiment provides the method for identifying an encrypted data stream applied to the core network device, which can perform authentication with the UE in the TLS handshake process of the UE and the OTT server or after the handshake is completed, and thus establish the association relationship for identifying the encrypted data stream to realize the detection and the statistics of the encrypted data stream. There is no need to rely on the plaintext identifier, and no complicated IP address configuration and maintenance are required, thereby improving the safety and reducing the computing resources required for the configuration and maintenance.

Embodiment 2

Figure 2:
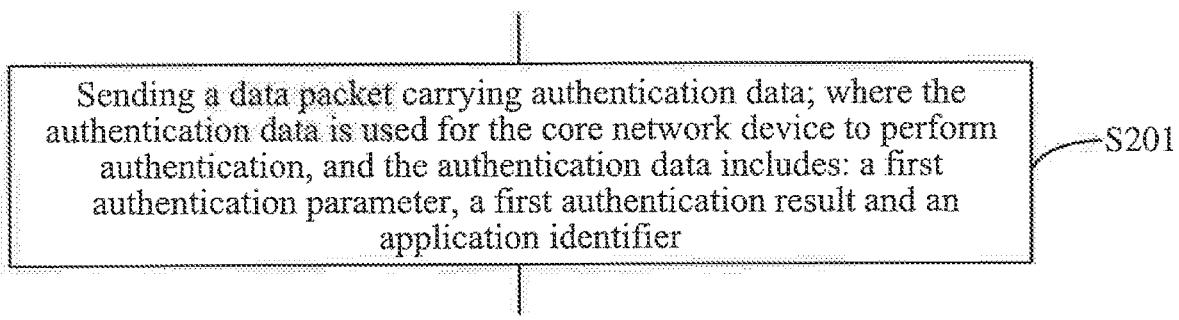
FIG. 2 is a schematic flow chart of another method for identifying an encrypted data stream according to an embodiment of the present disclosure.

Based on the same inventive concept of the foregoing embodiment and referring to FIG. 2, which illustrates a method for identifying an encrypted data stream provided in an embodiment of the present disclosure, the method can be applied to a UE, and the method shown in FIG. 2 can include:

S201: sending a data packet carrying authentication data; where the authentication data is used for a core network device to perform authentication, and the authentication data includes: a first authentication parameter, a first authentication result and an application identifier.

It can be understood that, after the UE sends the authentication data to the core network device, the core network device can perform authentication according to the technical solution of the foregoing embodiment, thereby establishing the association relationship for identifying the encrypted data stream to realize the detection and the statistics of the encrypted data stream. There is no need to rely on the plaintext identifier; and no complicated IP address configuration and maintenance are required, thereby improving the safety and reducing the computing resources required for the configuration and maintenance.

As for the technical solution shown in FIG. 2, in a first possible implementation, the technical solution shown in FIG. 2 can be implemented in the process of establishing a TLS handshake between the UE and an OTT server, and therefore, the sending a data packet carrying authentication data includes:

carrying the authentication data in a plaintext field of a first TLS handshake request in a TLS handshake process established by an application layer session; and performing transparent transmission on the first TLS handshake request carrying the authentication data to a control plane of the core network device through a user plane of the core network device.

As for the technical solution shown in FIG. 2, in a second possible implementation, the technical solution shown in FIG. 2 can be implemented after the TLS handshake is completed between the UE and the OTT server, and therefore, the sending a data packet carrying authentication data includes:

after completing the TLS handshake, sending an authentication request carrying the authentication data in an extended PDCP field to a base station, converting, through the base station, the authentication data in the extended PDCP field into an extended GTP-U field and continuing to send the authentication request to the user plane of the core network device.

As for the technical solution shown in FIG. 2, in a third possible implementation, the technical solution shown in FIG. 2 can be implemented after the TLS handshake is completed between the UE and the OTT server, but this implementation is different from the second implementation manner in that the authentication request is directly sent to the control plane of the core network device by the UE. Therefore, the sending a data packet carrying authentication data includes:

sending a non-access stratum session management NAS-SM message to the control plane of the core network device after the TLS handshake is completed; where an extended field of the NAS-SM message includes: the first authentication parameter, the first authentication result, the application identifier and characteristic information of the NAS-SM message; where the first authentication parameter includes: a random number and a public key Ka; the characteristic information of the NAS-SM message includes an IP address of the OTT server, a port number, a protocol type and a MAC address of the OTT server.

In addition, for the technical solution shown in FIG. 2, after the core network device establishes the association relationship between the characteristic information of the data packet and the application identifier, a life cycle of the association relationship can also be determined by the UE. Based on this, in an implementation, the method further includes:

sending an effective time message to the core network device; where the effective time message is used for indicating an effective duration of the association relationship between the characteristic information of the data packet and the application identifier for identifying the encrypted data stream.

In an implementation, the method further includes: sending a release indication message to the core network device; where the release indication message is used for releasing the association relationship.

It should be noted that both the effective time message and the release indication message can be sent through a NAS message.

For the technical solution shown in FIG. 2, after the core network device completes authentication, the method further includes: receiving an authentication result returned by the control plane of the core network device. It can be understood that, after receiving the comparison result, the UE can know whether the core network device completes the establishment of the association relationship, so as to determine whether to continue the authentication with the core network device.

Embodiment 3

Based on the same inventive concept of the foregoing embodiments, this embodiment elaborates the technical solutions of the foregoing two embodiments by the following specific examples.

It should be noted for specific examples that, the specific examples introduce a parameter set for an application. For example, the parameter set can include: a public key Ka, a random number, a token (Token), an application identifier (Application ID). The Token is generated by the Ka and the random number in combination with a preset authentication algorithm. If the authentication algorithm is the HASH algorithm in an example, then Token=HASH (Ka, random number) can be obtained. Therefore, the public key Ka and the random number are authentication parameters, the Token can be the authentication result, and the application identifier (Application ID) is used to represent the corresponding application. It should be noted that the Ka is an optional authentication parameter; the Ka may also be searched in a core network database by the core network device through the application identifier, and a correspondence between the application identifier in the core network database and the Ka can be pre-configured in the database by a third-party server.

In addition, the authentication result Token can also be generated by the Ka (optional), the random number and the application identifier in combination with the preset authentication algorithm. Still taking the HASN algorithm as an example, the authentication result Token=HASH (Ka, random number, application identifier) can be obtained; at this time, the public key Ka (optional), the random number, and the application identifier are authentication parameters.

Figure 3:
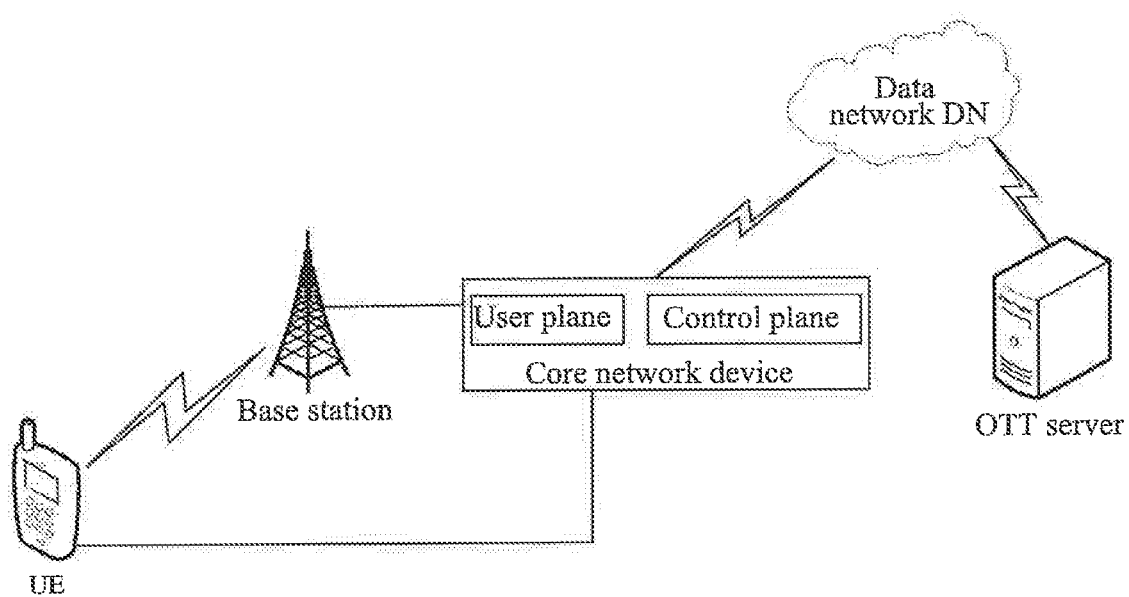
FIG. 3 is a schematic diagram of a network architecture according to an embodiment of the present disclosure.

It should be noted that the Ka and the random number are generated by the OTT server, and the authentication algorithm is statically configured on the core network device and the UE through the OTT server. The specific examples of this embodiment can be applied to an atypical network architecture as shown in FIG. 3. In this network architecture, the UE accesses the core network through the base station, or may be directly connected to the core network device. The core network device includes two parts, namely the user plane and the control plane. The UE is connected to a data network (DN, Data Network) through the core network device, so as to realize information interaction with the OTT server. Based on the above network architecture, following specific examples are proposed.

SPECIFIC EXAMPLE 1

Figure 4:
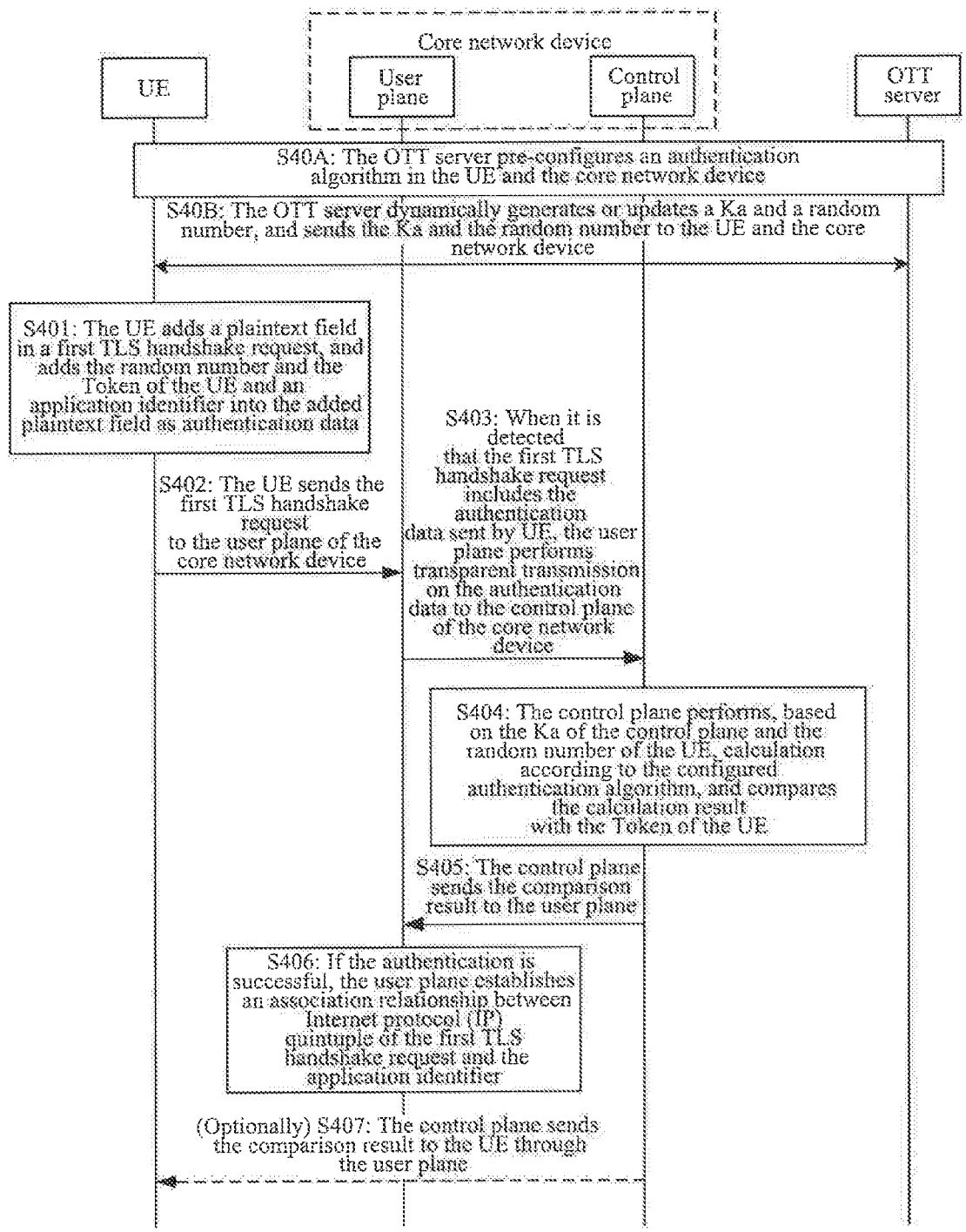
FIG. 4 is a flow chart illustrating a specific example of a method for identifying an encrypted data stream according to an embodiment of the present disclosure.

Referring to FIG. 4, a specific exemplary process of a method for identifying an encrypted data stream according to an embodiment of the present disclosure is shown. The process can include:

S40A: the OTT server pre-configures an authentication algorithm in the UE and the core network device;

S40B: the OTT server dynamically generates or updates a Ka and a random number, and sends the Ka and the random number to the UE and the core network device.

It can be understood that, after receiving respective Ka and random number, the UE and the core network device can perform calculation according to the authentication algorithm configured in S40A, and obtain a respective authentication result Token.

S401: The UE adds a plaintext field in a first TLS handshake request, and adds the random number and the Token of the UE and an application identifier into the added plaintext field as authentication data;

S402: the UE sends the first TLS handshake request to the user plane of the core network device;

S403: when it is detected that the first TLS handshake request includes the authentication data sent by the UE, the user plane performs transparent transmission on the authentication data to the control plane of the core network device;

S404: the control plane performs, based on the Ka of the control plane and the random number of the UE, calculation according to the configured authentication algorithm, and compares the calculation result with the Token of the UE; if the two are consistent, the comparison result is that the authentication is successful; otherwise, the comparison result is that the authentication fails.

S405: the control plane sends the comparison result to the user plane; and

S406: if the authentication is successful, the user plane establishes an association relationship between characteristic information of the first TLS handshake request and the application identifier.

It can be understood that the association relationship enables the core network device to identity the encrypted data stream of the application represented by the application identifier subsequently, and count the traffic of the encrypted data stream according to the identification result.

In this embodiment, according to an implementation, as shown by the dotted arrow, there is S407: the control plane sends the comparison result to the UE through the user plane. Therefore, after receiving the comparison result, the UE can know whether the core network device completes the establishment of the association relationship, and can thus determine whether to continue the authentication with the core network device.

SPECIFIC EXAMPLE 2

Figure 5:
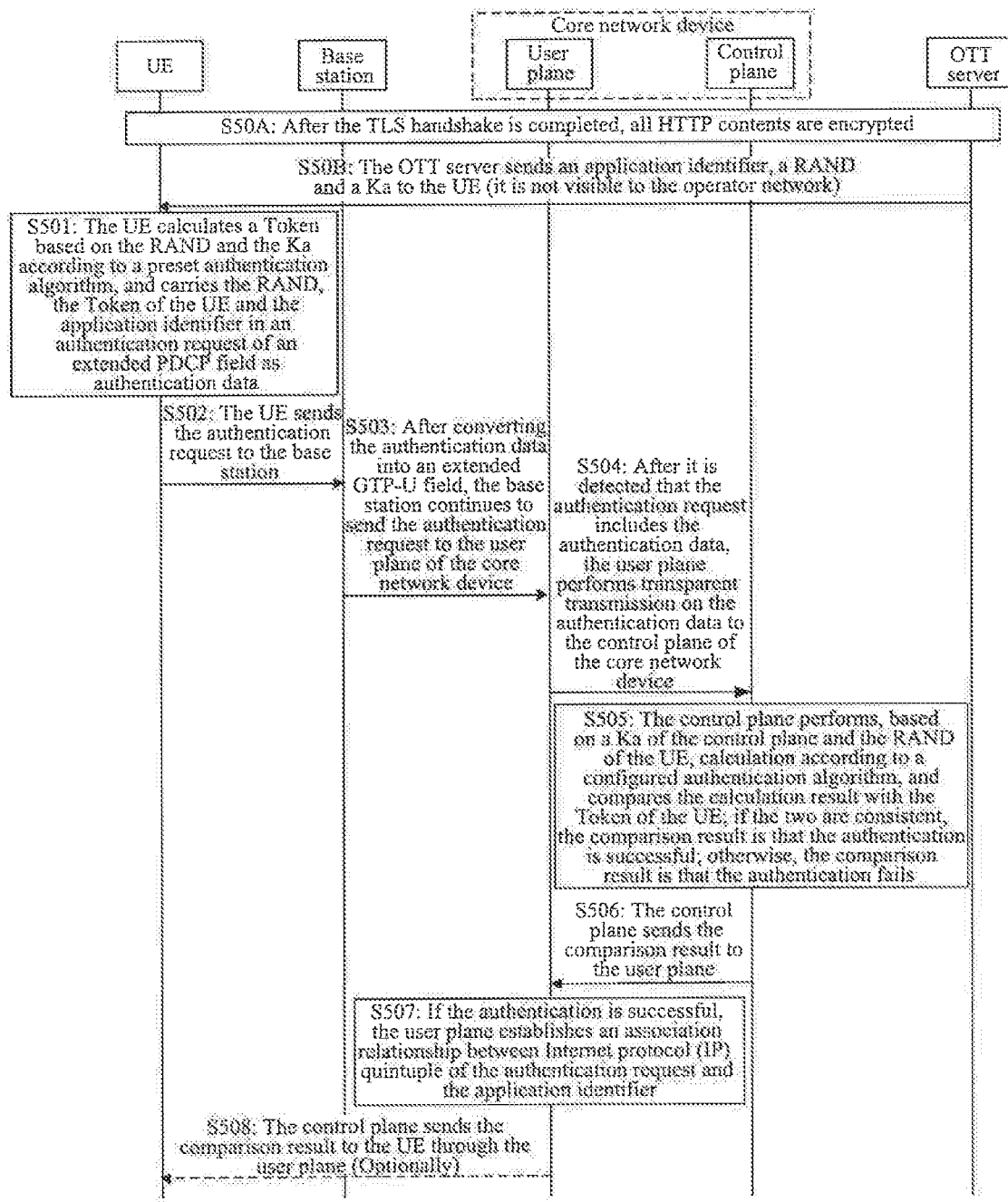
FIG. 5 is a flow chart illustrating a specific example of another method for identifying an encrypted data stream according to an embodiment of the present disclosure.

Referring to FIG. 5, a specific exemplary process of a method for identifying an encrypted data stream according to an embodiment of the present disclosure is shown. The process is implemented after the TLS handshake is completed between the UE and the OTT server, and the process can include:

S50A: after the TLS handshake is completed, all HTTP contents are encrypted;

S50B: the OTT server sends an application identifier, a random number and a Ka to the UE.

It will be appreciated that when the OTT sends the above information to the UE, it is not visible to the operator network.

S501: The UE calculates a Token based on the random number and the Ka according to a preset authentication algorithm, and carries the random number, the Token of the UE and the application identifier in an extended PDCP field of an authentication request as authentication data;

S502: the UE sends the authentication request to the base station;

S503: after converting the authentication data into an extended GTP-U field, the base station continues to send the authentication request to the user plane of the core network device;

S504: after it is detected that the authentication request includes the authentication data, the user plane performs transparent transmission on the authentication data to the control plane of the core network device;

S505: the control plane performs, based on a Ka of the control plane and the random number of the UE, calculation according to a configured authentication algorithm, and compares the calculation result with the Token of the UE; if the two are consistent, the comparison result is that the authentication is successful; otherwise, the comparison result is that the authentication fails.

S506: the control plane sends the comparison result to the user plane; and

S507: if the authentication is successful, the user plane establishes an association relationship between characteristic information of the authentication request and the application identifier.

It can be understood that the association relationship enables the core network device to identify the encrypted data stream of the application represented by the application identifier subsequently, and count the traffic of the encrypted data stream according to the identification result.

In this embodiment, according to an implementation, as shown by the dotted arrow, there is S508: the control plane sends the comparison result to the UE through the user plane. Therefore, after receiving the comparison result, the UE can know whether the core network device completes the establishment of the association relationship, and can thus determine whether to continue the authentication with the core network device.

SPECIFIC EXAMPLE 3

Figure 6A:
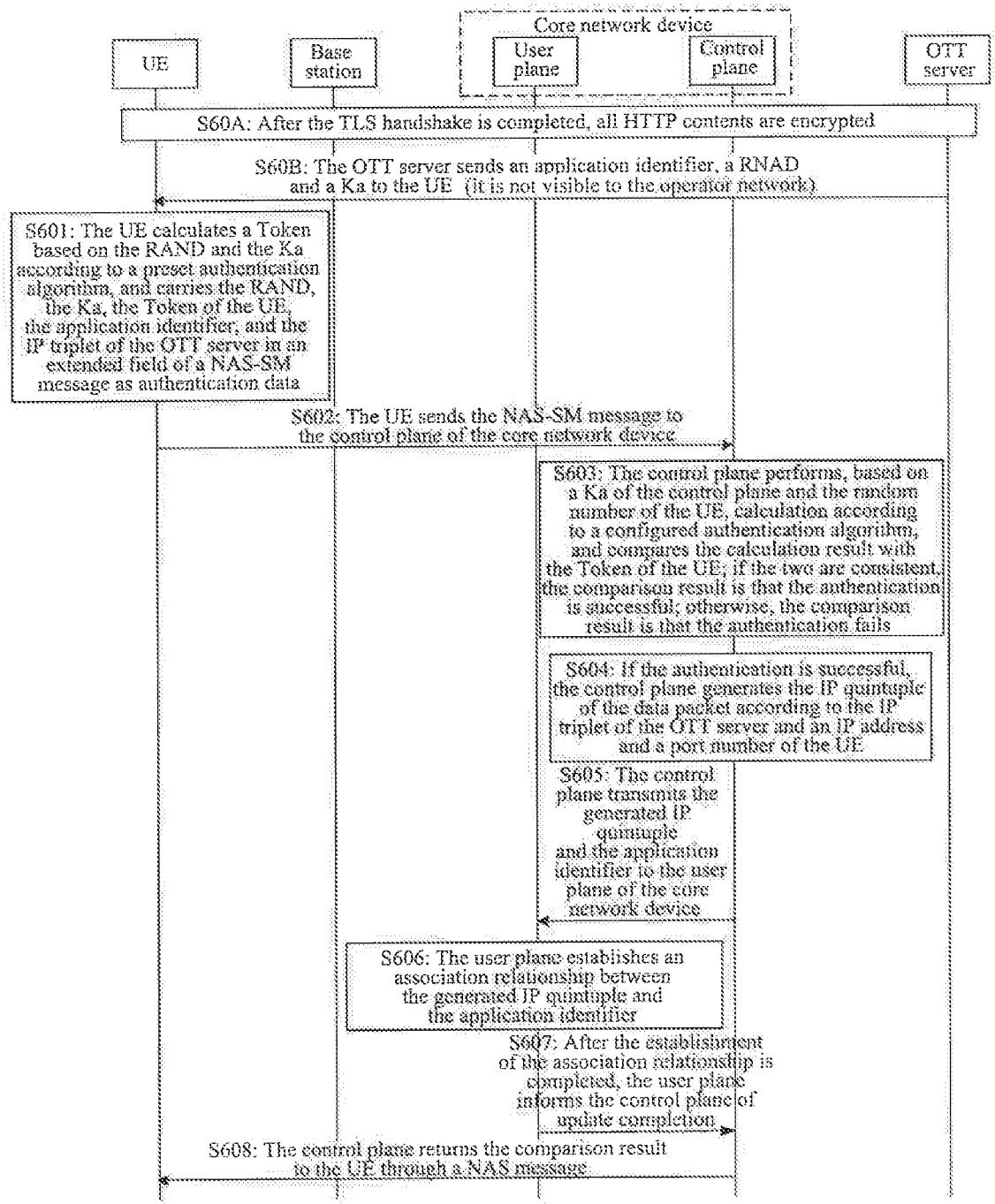
FIG. 6A is a flow chart illustrating a specific example of still another method for identifying an encrypted data stream according to an embodiment of the present disclosure.

Referring to FIG. 6A, a specific exemplary process of a method for identifying an encrypted data stream according to an embodiment of the present disclosure is shown. The process is implemented after the TLS handshake is completed between the UE and the OTT server, and the process can include:

S60A: after the TLS handshake is completed, all HTTP contents are encrypted;

S60B: the OTT server sends an application identifier, a random number and a Ka to the UE.

It will be appreciated that when the OTT sends the above information to the UE, it is not visible to the operator network.

S601: The UE calculates a Token based on the random number and the Ka according to a preset authentication algorithm, and carries the random number, the Ka, the Token of the UE, the application identifier, and characteristic information of the OTT server in an extended field of a NAS-SM message as authentication data.

It will be appreciated that the IP triplet of the OTT server may include an IP address, a port number and a protocol type of the OTT server.

S602: The UE sends the NAS-SM message to the control plane of the core network device, so as to request session modification to the control plane;

S603: the control plane performs, based on a Ka of the control plane and the random number of the UE, calculation according to a configured authentication algorithm, and compares the calculation result with the Token of the UE; if the two are consistent, the comparison result is that the authentication is successful; otherwise, the comparison result is that the authentication fails;

S604: if the authentication is successful, the control plane generates characteristic information of the data packet according to characteristic information of the OTT server and characteristic information of the UP;

S605: the control plane transmits the generated characteristic information of the data packet and the application identifier to the user plane of the core network device;

S606: the user plane establishes an association relationship between the generated characteristic information of the data packet and the application identifier;

S607: after the establishment of the association relationship is completed, the user plane informs the control plane of update completion; and S608: the control plane returns the comparison result to the UE through a NAS message.

SPECIFIC EXAMPLE 4

Figure 6B:
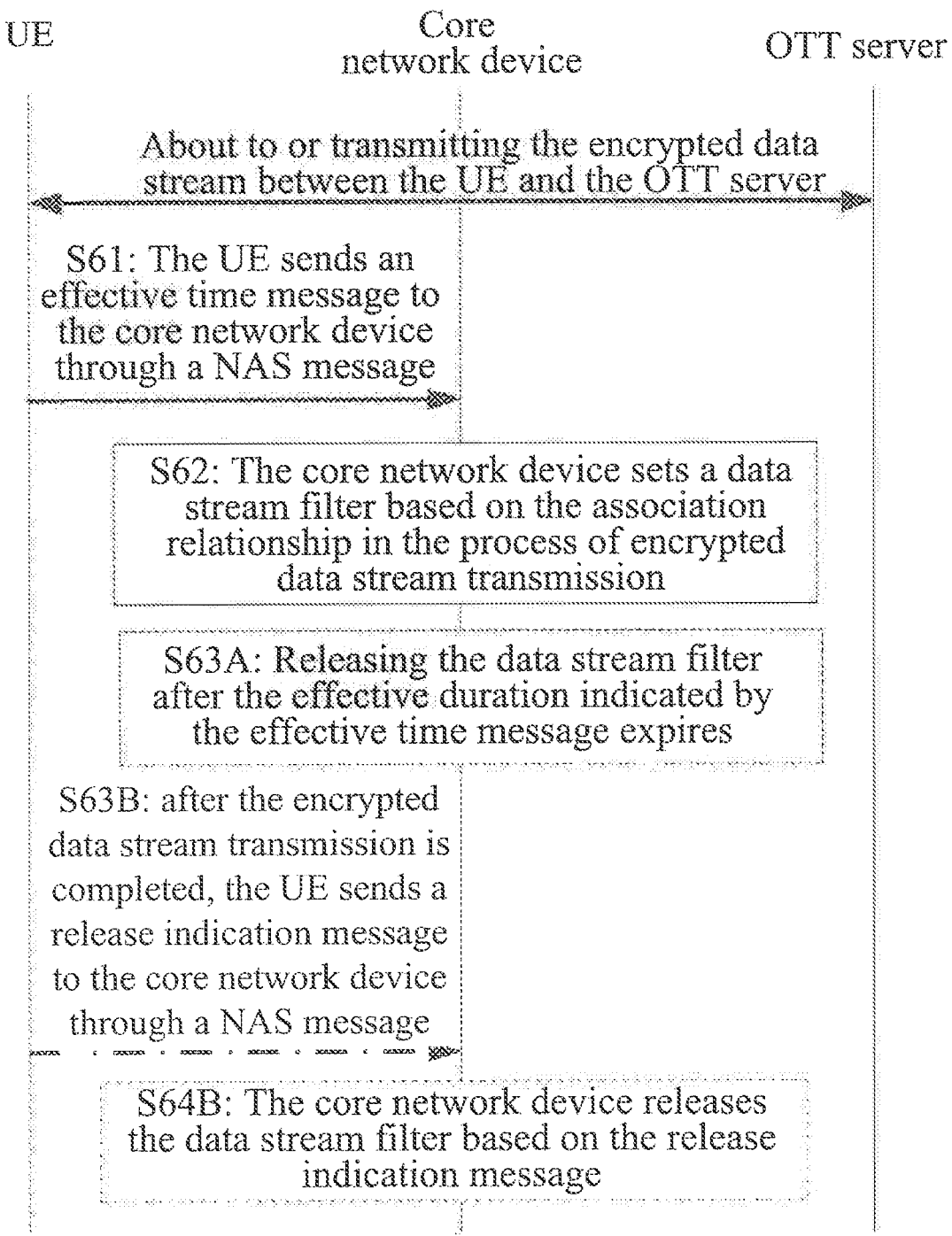
FIG. 6B is a flow chart illustrating a specific example of yet another method for identifying an encrypted data stream according to an embodiment of the present disclosure.

After the association relationship is established based on the foregoing specific examples, a life cycle can also be established for the association relationship in the process of encrypted data transmission. Based on this and referring to a transmission method of an encrypted data stream shown in FIG. 6B, the method can be applied to the process of the encrypted data stream being about to be transmitted or being transmitted between the UE and the OTT server, and the method can include:

S61: the UE sends an effective time message to the core network device through a NAS message;

where the effective time message is used for indicating an effective duration of the association relationship between the characteristic information of the data packet and the application identifier for identifying the encrypted data stream.

It can be understood that the above effective duration represents a life cycle of the association relationship. Based on this, the method can further include S62: the core network device sets a data stream filter based on the association relationship in the process of encrypted data stream transmission.

In this step, the data stream filter can be considered as a concrete embodiment of the association relationship. Therefore, the life cycle of the association relationship is the same as the life cycle of the data stream filter. In an implementation, as shown by the dashed box in FIG. 6B, S63A: releasing the data stream filter after the effective duration indicated by the effective time message expires.

In addition, the life cycle of the association relationship can also be determined by an indication from the UE in addition to the above effective duration. Therefore, in an implementation, as shown by the dashed-dotted line in FIG. 6B, S63B: after the encrypted data stream transmission is completed, the UE sends a release indication message to the core network device through a NAS message;

S64B: the core network device releases the data stream filter based on the release indication message.

It can be understood that, when the core network device releases the data stream filter based on the release indication message sent by the UE, the limitation of the effective duration may not need to be considered. Moreover, in another specific implementation process, even if the effective duration expires, in the case that the encrypted data stream transmission is not terminated, the core network device does not release the data stream filter, and does not release the data stream filter until the encrypted data stream transmission is completed.

Based on the specific example 4, an embodiment of the present disclosure provides a method for transmitting an encrypted data stream, which is applied to a core network device. The method includes:

after an association relationship between characteristic information of a data packet and an application identifier is established, receiving an effective time message sent by a user equipment (UE); where the effective time message is used for indicating an effective duration of the association relationship for identifying an encrypted data stream;

performing, within the effective duration, encrypted data stream transmission with the LE based on the association relation;

receiving a release indication message sent by the UE; and releasing the association relationship based on the release indication message.

In the above solution, the method further includes:

releasing the association relationship after the effective duration expires; or after the effective duration expires, continuing the encrypted data stream transmission with the UE, and releasing the association relationship after the encrypted data stream transmission is completed.

Furthermore, based on the specific example 4, an embodiment of the present disclosure further provides a method for transmitting an encrypted data stream, which is applied to a UE. The method is applied to a user equipment (UE), and the method includes:

sending an effective time message to a core network device; where the effective time message is used for indicating an effective duration of an association relationship between characteristic information of a data packet and an application identifier for identifying an encrypted data stream;

performing, within the effective duration, encrypted data stream transmission with the core network device based on the association relationship; and sending a release indication message to the core network device; where the release indication message is used for releasing the association relationship.

Embodiment 4

Figure 7A:
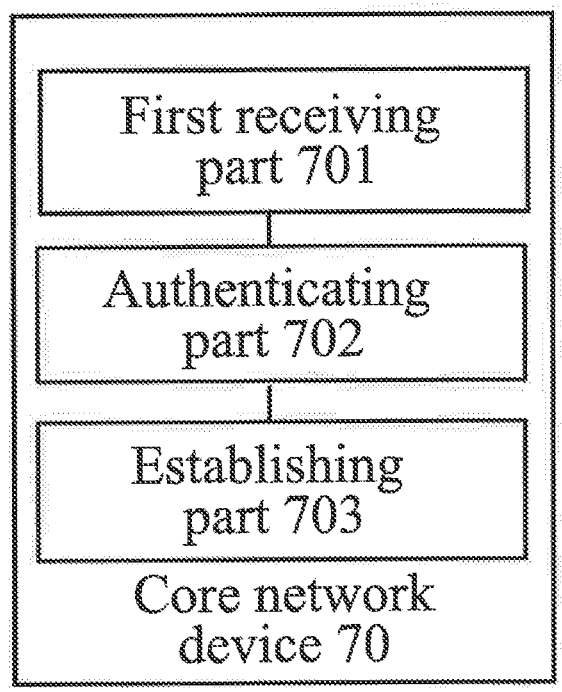
FIG. 7A is a schematic structural diagram of a core network device according to an embodiment of the present disclosure.

Based on the same inventive concept of the foregoing embodiments, referring to FIG. 7A, FIG. 7A shows a structure of a core network device 70 provided in an embodiment of the present disclosure, which can include: a first receiving part 701, an authenticating part 702, and an establishing part 703; where, the first receiving part 701 is configured to receive a data packet carrying authentication data sent by a user equipment (UE); where the authentication data includes a first authentication parameter, a first authentication result and an application identifier;

the authenticating part 702 is configured to obtain, based on the first authentication parameter and a second authentication parameter, a second authentication result according to a set authentication algorithm; where the second authentication parameter is a pre-stored authentication parameter corresponding to the application identifier; and the establishing part 703 is configured to establish an association relationship between characteristic information of the data packet and the application identifier when the second authentication result is consistent with the first authentication result in comparison; where the association relationship is used for subsequently identifying an encrypted data stream which is sent by the UE and corresponds to the application identifier.

In a possible implementation, the first receiving part 701 is configured to receive a first TLS handshake request sent by the UE in a TLS handshake process established by an application layer session; where the authentication data is carried in a plaintext field of the first TLS handshake request.

In a possible implementation, the first receiving part 701 is configured to: receive, by a user plane of the core network device, an authentication request sent by the UE through a base station after a TLS handshake is completed; where the authentication data is carried in an extended GTP-U field of the authentication request.

It can be understood that, in the above two implementations, the first receiving part 701 can be a user plane of the core network device 70, and accordingly, the authenticating part is a control plane of the core network device 70, and the establishing part is the user plane of the core network device 70.

In a possible implementation, the first receiving part 701 is configured to receive, by the control plane of the core network device, a non-access stratum session management (NAS-SM) message sent by the UE after a TLS handshake is completed; where an extended field of the NAS-SM message includes: a first authentication parameter, a first authentication result, an application identifier and characteristic information of the NAS-SM message; where the first authentication parameter includes: a random number and a public key Ka; the characteristic information of the NAS-SM message includes an IP address, a port number, a protocol type of an OTT server and a MAC address of the OTT server.

In the above implementation, the authenticating part 702 is configured to obtain, based on the random number in the first authentication parameter and a public key in the second authentication parameter, the second authentication result according to the set authentication algorithm.

In the above implementation, the establishing part 703 is configured to:

when the second authentication result is consistent with the first authentication result in comparison, generate the characteristic information of the data packet according to characteristic information of the OTT server and characteristic information of the UE, and establish the association relationship between the generated characteristic information of the data packet and the application identifier. Specifically, the characteristic information of the OTT server includes an IP address, a port number, a protocol type of the OTT server and a MAC address of the OTT server; the characteristic information of the LIE includes: an IP address, a port and a MAC address of the UE.

It can be understood that, in the above implementation, the first receiving part 701 and the authenticating part 702 can be the control plane of the core network device 70, and accordingly, the establishing part 703 is the user plane of the core network device 70.

Figure 7B:
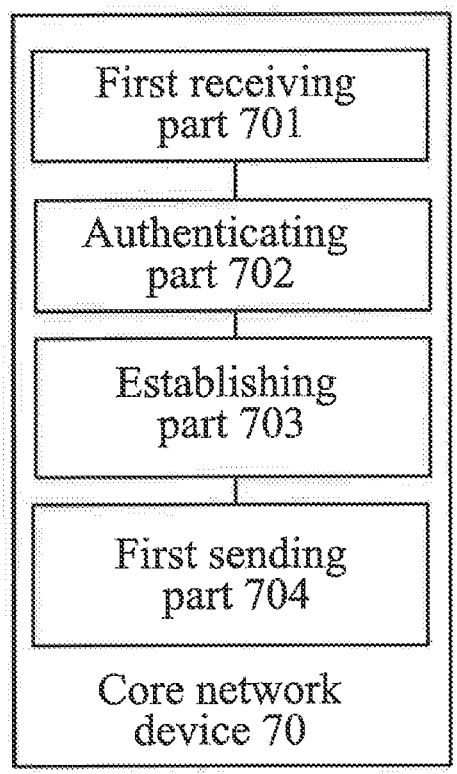
FIG. 7B is a schematic structural diagram of another core network device according to an embodiment of the present disclosure.

In a possible implementation, referring to FIG. 7B, the core network device 70 further includes a first sending part 704 configured to send a comparison result of the second authentication result and the first authentication result to the UE. It should be noted that the first sending part 704 is the control plane of the core network device 70.

In the above solution, the first receiving part 701 is further configured to receive an effective time message sent by the UE; where the effective time message is used for indicating an effective duration of the association relationship for identifying the encrypted data stream.

Figure 7C:
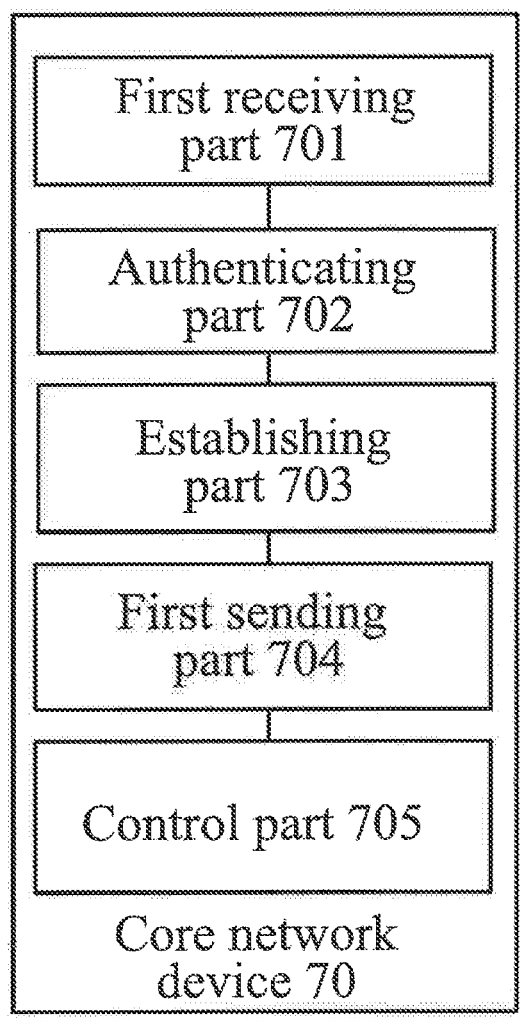
FIG. 7C is a schematic structural diagram of still another core network device according to an embodiment of the present disclosure.

In the above solution, referring to FIG. 7C, the core network device 70 further includes a control part 705, configured to: after the effective duration expires, release the association relationship if encrypted data stream transmission is not completed.

In the above solution, the first receiving part 701 is further configured to receive a release indication message sent by the UE after the encrypted data stream transmission is completed; and the control part 705 is further configured to release the association relationship based on the release indication message.

It can be understood that in this embodiment, a "part" may be part of a circuit, part of a processor, part of a program or software, etc. A "part" may also be a unit, and may also be a module or non-modular.

In addition, the components in the embodiment may be integrated in one processing unit, or each unit may exist alone physically, or two or more units are integrated in one unit. The integrated unit can be realized in a form of hardware or a form of a software functional module.

If the integrated unit is implemented in the form of a software functional module and is sold or used as an independent product, it may be stored in a computer readable storage medium. Based on such understanding, the technical solutions of this embodiment essentially, or a part contributing to the prior art, or all or part of the technical solutions may be embodied in the form of a software product stored in a storage medium, which includes several instructions for causing a computer device (which may be a personal computer, a server, or a network device, etc.) or a processor to execute all or part of the steps of the method of this embodiment. And the aforementioned storage medium includes: a U-disk, a removable hard disk, a read-only memory (ROM), a random access memory (RAM), a magnetic disk or an optical disk, and other various media capable of storing program codes.

Accordingly, this embodiment provides a computer readable medium, having a program for identifying an encrypted data stream stored thereon, where the program for identifying an encrypted data stream implements the steps of the method of Embodiment 1 when executed by at least one processor.

Figure 8:
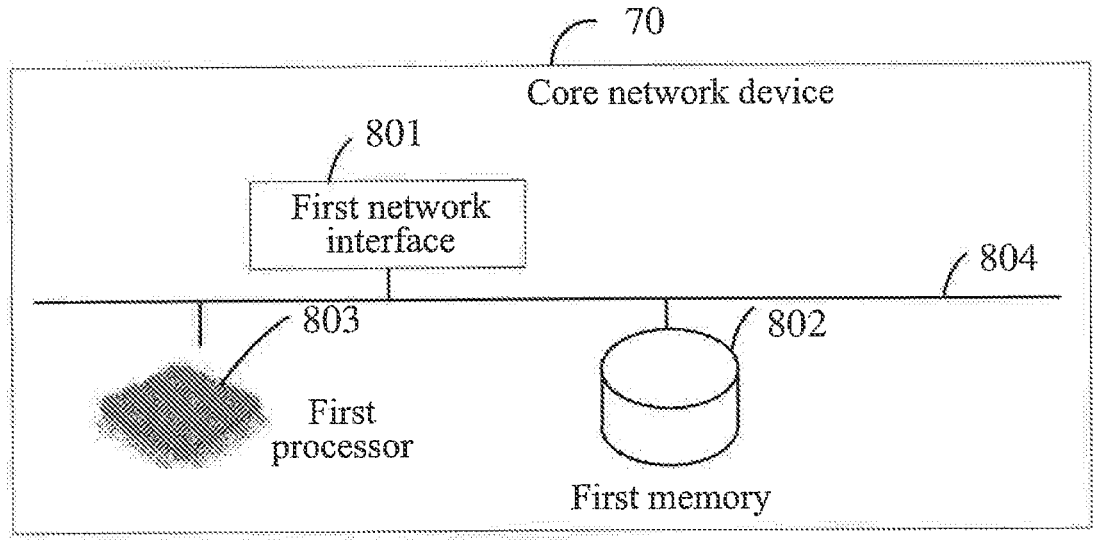
FIG. 8 is a schematic diagram of a specific hardware structure of a core network device according to an embodiment of the present disclosure.

Based on the above core network device 70 and computer readable medium and referring to FIG. 8, a specific hardware structure of the core network device 70 provided in an embodiment of the present disclosure is shown, and the specific hardware structure can include: a first network interface 801, a first memory 802, and a first processor 803; the various components are coupled together by a bus system 804. It can be understood that the bus system 804 is configured to enable connective communication among the components. The bus system 804 includes a power bus, a control bus, and a status signal bus in addition to a data bus. For clarity of illustration, however, the various buses are labeled as the bus system 804 in FIG. 8. The first network interface 801 is configured to receive and send signals in the process of receiving and sending information with other external network elements;

the first memory 802 is configured to store a computer program operable on the first processor 803;

the first processor 803 is configured to, when running the computer program, execute:

receiving a data packet carrying authentication data sent by a user equipment (UE); where the authentication data includes a first authentication parameter, a first authentication result and an application identifier;

obtaining, based on the first authentication parameter and a second authentication parameter, a second authentication result according to a set authentication algorithm; where the second authentication parameter is a pre-stored authentication parameter corresponding to the application identifier; and establishing an association relationship between characteristic information of the data packet and the application identifier when the second authentication result is consistent with the first authentication result in comparison; where the association relationship is used for subsequently identifying an encrypted data stream which is sent by the UE and corresponds to the application identifier.

It can be appreciated that the first memory 802 in embodiments of the present disclosure can be either volatile memory or nonvolatile memory, or can include both volatile memory and nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash Memory. The volatile memory may be a random access memory (RAM), which acts as an external cache memory. By way of illustration but not limitation, many forms of RAMs are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM), and direct memory bus random access memory (Direct Rambus RAM, DRRAM). The first memory 802 of the systems and methods described herein is intended to include, without being limited to, these and any other suitable types of memories.

The first processor 803 may be an integrated circuit chip having signal processing capabilities. In the implementation process, the steps of the above methods may be performed by integrated logic circuits of hardware or instructions in the form of software in the first processor 803. The first processor 803 may be a general purpose processor, a digital signal processor (DSP), an application specific integrated circuit (ASIC), a field programmable gate array (FPGA) or other programmable logic device, discrete Gate or transistor logic device, or discrete hardware component. The various methods, steps and logic blocks disclosed in the embodiments of the present disclosure may be implemented or performed. A general purpose processor may be a microprocessor or the processor may be any conventional processor or the like. The steps of the methods disclosed in connection with the embodiments of the present disclosure may be directly implemented by a hardware decoding processor, or implemented by a combination of hardware and software modules in the decoding processor. The software module may be located in a random access memory, a flash memory, a read-only memory, programmable read-only memory, or electrically erasable programmable memory, registers, etc. storage media as is well known in the art. The storage medium is located in the first memory 802, and the first processor 803 reads the information in the first memory 802, and completes the steps of the above methods in combination with the hardware thereof.

It can be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSP Devices, DSPDs), programmable logic devices (PLDs), field-programmable gate arrays (FPGAs), general purpose processors, controllers, micro-controllers, microprocessors, other electronic units configured to perform the functions described herein, or a combination thereof.

For a software implementation, the techniques described herein may be implemented with modules (e.g., procedures, functions, and so on) that perform the functions described herein. The software codes may be stored in a memory and executed by a processor. The memory may be implemented within the processor or external to the processor.

Specifically, the first processor 803 in the core network device 70 is further configured to, when running the computer program, execute the method steps described in the foregoing Embodiment 1, which is not described here again.

Embodiment 5

Figure 9:
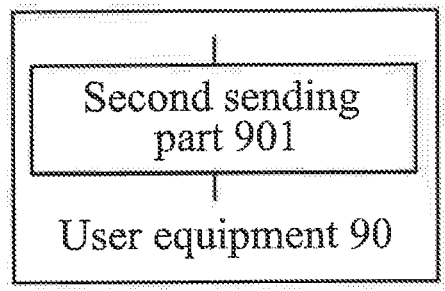
FIG. 9 is a schematic structural diagram of a user equipment according to an embodiment of the present disclosure.

Based on the same inventive concept of the foregoing embodiments and referring to FIG. 9, FIG. 9 illustrates a structure of a user equipment 90 provided by an embodiment of the present disclosure, which can include: a second sending part 901 configured to send a data packet carrying authentication data; where the authentication data is used for a core network device to perform authentication, and the authentication data includes: a first authentication parameter, a first authentication result and an application identifier.

In the above solution, the second sending part 901 is configured to: carry the authentication data in a plaintext field of a first TLS handshake request in a TLS handshake process established by an application layer session; and perform transparent transmission on the first TLS handshake request carrying the authentication data to a control plane of the core network device through a user plane of the core network device.

In the above solution, the second sending part 901 is configured to: send an authentication request carrying the authentication data in an extended PDCP field to a base station after a TLS handshake is completed, convert, through the base station, the authentication data in the extended PDCP field into an extended GTP-U field and continue to send the authentication request to the user plane of the core network device.

In the above solution, the second sending part 901 is configured to: send a non-access stratum session management (NAS-SM) message to the control plane of the core network device after the TLS handshake is completed; where an extended field of the NAS-SM message includes: a first authentication parameter, a first authentication result, an application identifier and characteristic information of the NAS-SM message; where the first authentication parameter includes: a random number and a public key Ka; the characteristic information of the NAS-SM message includes an IP address, a port number, a protocol type of an OTT server and a MAC address of the OTT server.

Figure 10:
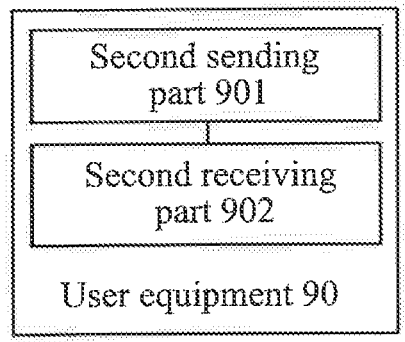
FIG. 10 is a schematic structural diagram of another user equipment according to an embodiment of the present disclosure.

In the above solution, referring to FIG. 10, the UE 90 further includes a second receiving part 902 configured to receive an authentication result returned by the control plane of the core network device.

In the above solution, the second sending part 901 is further configured to send an effective time message to the core network device; where the effective time message is used for indicating an effective duration of an association relationship between characteristic information of the data packet and the application identifier for identifying an encrypted data stream.

In the above solution, the second sending part 901 is further configured to send a release indication message to the core network device; where the release indication message is used for releasing an association relationship.

Furthermore, the present embodiment also provides a computer readable medium, having a program for identifying an encrypted data stream stored thereon, where the program for identifying an encrypted data stream implements the steps of the method described in Embodiment 2 when executed by at least one processor. For specific description of the computer readable medium, please refer to the description in Embodiment 4, which is not repeated here.

Figure 11:
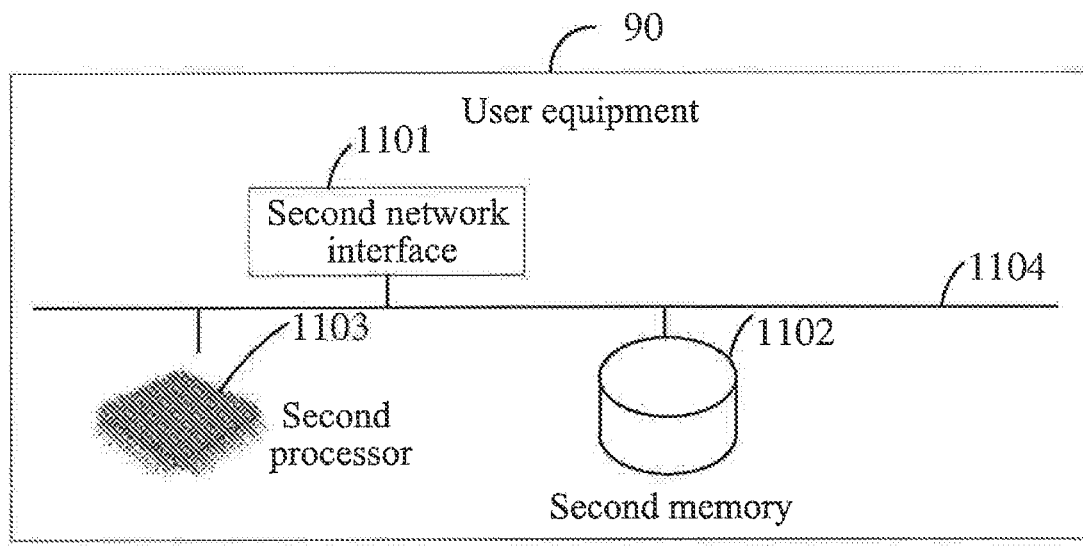
FIG. 11 is a schematic diagram of a specific hardware structure of a user equipment according to an embodiment of the present disclosure.

Based on the above structure of the UE 90 and the computer readable medium and referring to FIG. 11, FIG. 11 shows a specific hardware structure of the 90 provided by an embodiment of the present disclosure, which can include: a second network interface 1101, a second memory 1102 and a second processor 1103; the various components are coupled together by a bus system 1104. It is understood that the bus system 1104 is configured to enable connective communication among the components. The bus system 1104 includes a power bus, a control bus, and a status signal bus in addition to a data bus. For clarity of illustration, however, the various buses are labeled as the bus system 1104 in FIG. 11.

The second network interface 1101 is configured to receive and send signals in a process of receiving and sending information with other external network elements;

the second memory 1102 is configured to store a computer program operable on a second processor 1103;

the second processor 1103 is configured to, when running the computer program, execute:

sending a data packet carrying authentication data; where the authentication data is used for a core network device to perform authentication, and the authentication data includes: a first authentication parameter, a first authentication result and an application identifier.

It can be understood that, in this embodiment, the components in the specific hardware structure of the UE 90 are similar to the corresponding components in Embodiment 4, which are not described here again.

Specifically, the second processor 1103 in the UE 90 is further configured to execute the method steps described in Embodiment 2 when running the computer program, which is not described here again.

Embodiment 6

Figure 12:
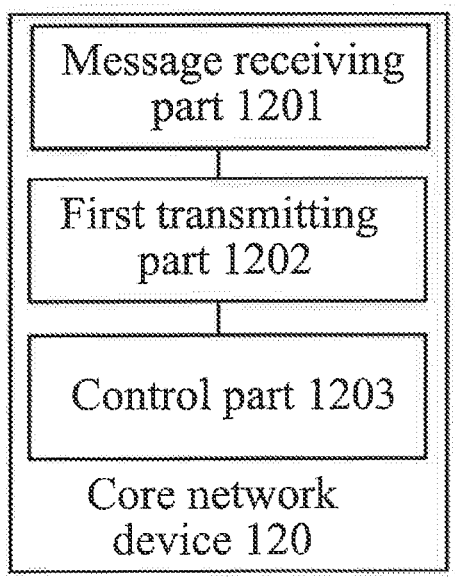
FIG. 12 is a schematic structural diagram of another core network device according to an embodiment of the present disclosure.

Based on the same inventive concept of the foregoing embodiments and referring to FIG. 12, FIG. 12 shows another core network device 120 provided in an embodiment of the present disclosure, including: a message receiving part 1201, a first transmitting part 1202, and a control part 1203; where the message receiving part 1201 is configured to receive an effective time message sent by a user equipment (UE) after an association relationship between characteristic information of a data packet and an application identifier is established; where the effective time message is used for indicating an effective duration of the association relationship for identifying an encrypted data stream;

the first transmitting part 1202 is configured to perform, within the effective duration, encrypted data stream transmission with the UE based on the association relationship;

the message receiving part 1201 is further configured to receive a release indication message sent by the UE after the encrypted data stream transmission is completed; and the control part 1203 is configured to release the association relationship based on the release indication message.

In the above solution, the control part 1203 is further configured to release the association relationship after the effective duration expires; or continue, after the effective duration expires, the encrypted data stream transmission with the UE until the first receiving part receives the release indication message after the encrypted data stream transmission is completed, and release the association relationship based on the release indication message.

Furthermore, this embodiment provides a computer readable medium, having a program for transmitting an encrypted data stream stored thereon, where the program for transmitting an encrypted data stream implements the steps of the method described in the specific example 4 of Embodiment 3 when executed by at least one processor. For specific description of the computer readable medium, please refer to the description in Embodiment 4, which is not repeated here.

Figure 13:
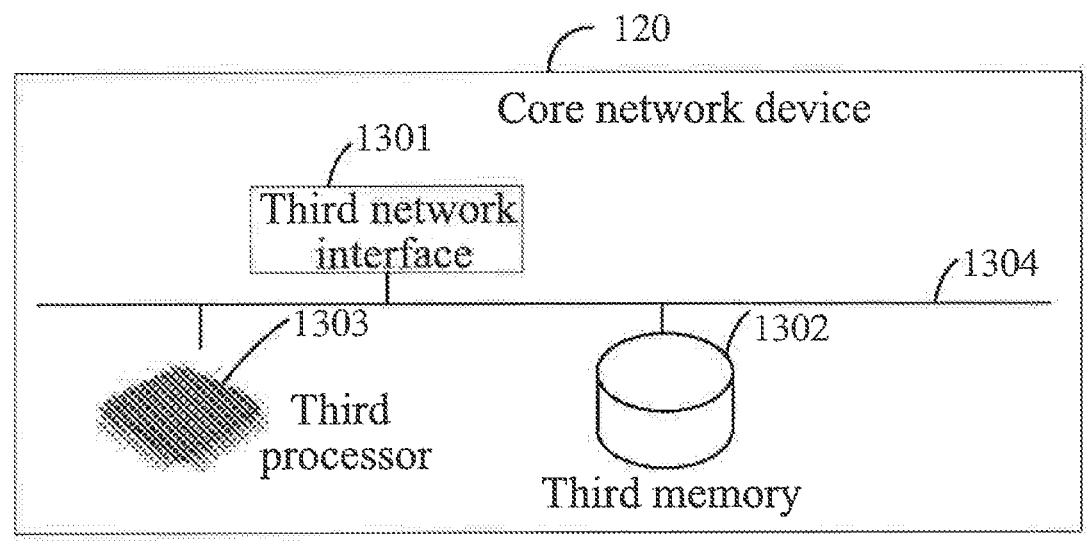
FIG. 13 is a schematic diagram of a specific hardware structure of another core network device according to an embodiment of the present disclosure.

Based on the above components of the core network device 120 and the computer readable medium and referring to FIG. 13, FIG. 18 shows a specific hardware structure of the core network device 120 provided in an embodiment of the present disclosure, which can include: a third network interface 1301, a third memory 1302, and a third processor 1303; the various components are coupled together by a bus system 1304. It can be understood that the bus system 1304 is configured to enable connective communication among the components. The bus system 1304 includes a power bus, a control bus, and a status signal bus in addition to a data bus. For clarity of illustration, however, the various buses are labeled in FIG. 13 as the bus system 1304.

The third network interface 1301 is configured to receive and send signals in a process of receiving and sending information with other external network elements;

the third memory 1302 is configured to store a computer program operable on the third processor 1303;

the third processor 1303 is configured to, when running the computer program, execute:

receiving an effective time message sent by a user equipment (UE) after an association relationship between characteristic information of a data packet and an application identifier is established; where the effective time message is used for indicating an effective duration of the association relationship for identifying an encrypted data stream;

performing, within the effective duration, encrypted data stream transmission with the UE based on the association relationship;

receiving a release indication message sent by the UE after the encrypted data stream transmission is completed; and releasing the association relationship based on the release indication message.

It can be understood that, in this embodiment, components in the specific hardware structure of the core network device 120 are similar to corresponding components in Embodiment 4, which are not described here again.

Specifically, the third processor 1303 in the core network device 120 is further configured to execute the method steps specifically illustrated in Embodiment 4 when miming the computer program, which is not described here again.

Embodiment 7

Figure 14:
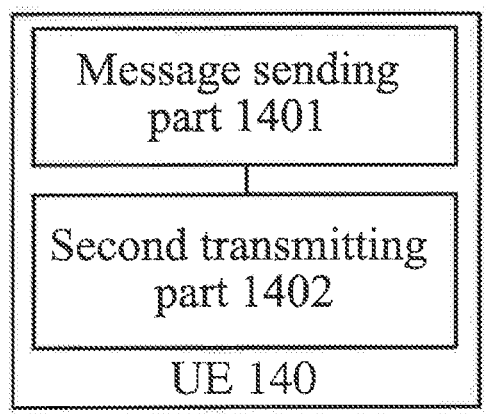
FIG. 14 is a schematic structural diagram of another UE according to an embodiment of the present disclosure.

Based on the same inventive concept of the foregoing embodiments and referring to FIG. 14, FIG. 14 shows another UE 140 provided in an embodiment of the present disclosure, which includes: a message sending part 1401 and a second transmitting part 1402, where the message sending part 1401 is configured to send an effective time message to a core network device; where the effective time message is used for indicating an effective duration of an association relationship between characteristic information of a data packet and an application identifier for identifying an encrypted data stream;

the second transmitting part 1402 is configured to perform, within the effective duration, encrypted data stream transmission with the core network device based on the association relationship; and the message sending part 1401 is further configured to send a release indication message to the core network device; where the release indication message is used for releasing the association relationship.

Furthermore, this embodiment provides a computer readable medium, having a program for transmitting an encrypted data stream stored thereon, where the program for transmitting an encrypted data stream implements the steps of the method described in the specific example 4 of Embodiment 3 when executed by at least one processor. For specific description of the computer readable medium, please refer to the description in Embodiment 4, which is not repeated here.

Figure 15:
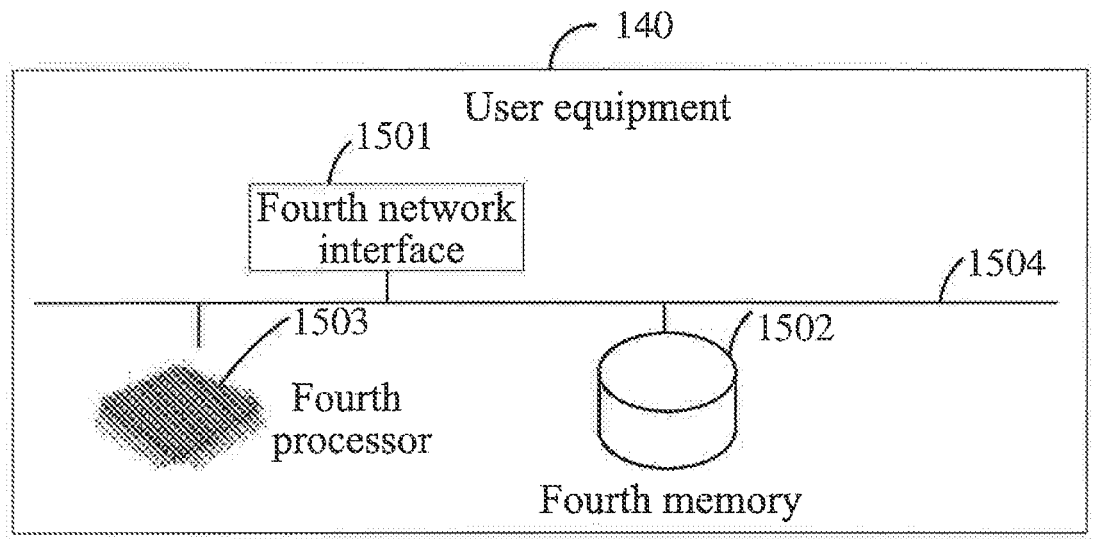
FIG. 15 is a schematic diagram of a specific hardware structure of another according to an embodiment of the present disclosure.

Based on the above structure of the UE 140 and the computer readable medium and referring to FIG. 15, FIG. 15 shows a specific hardware structure of the UE 140 provided in an embodiment of the present disclosure, which can include: a fourth network interface 1501, a fourth memory 1502, and a fourth processor 1503; the various components are coupled together by a bus system 1504. It can be understood that the bus system 1504 is used to enable connective communication among the components. The bus system 1504 includes a power bus, a control bus, and a status signal bus in addition to a data bus. For clarity of illustration, however, the various buses are labeled in FIG. 15 as the bus system 1504.

The fourth network interface 1501 is configured to receive and send signals in a process of receiving and sending information with other external network elements;

the fourth memory 1502 is configured to store a computer program operable on the fourth processor 1503;

the fourth processor 1503 is configured to, when running the computer program, execute:

sending an effective time message to the core network device; where the effective time message is used for indicating an effective duration of an association relationship between characteristic information of the data packet and the application identifier for identifying an encrypted data stream;

performing, within the effective duration, encrypted data stream transmission with the core network device based on the association relationship; and sending a release indication message to the core network device; where the release indication message is used for releasing the association relationship.

It can be understood that, in this embodiment, components in the specific hardware structure of the UE 140 are similar to corresponding components in Embodiment 4, and details are not described here again.

Embodiment 8

Figure 16A:
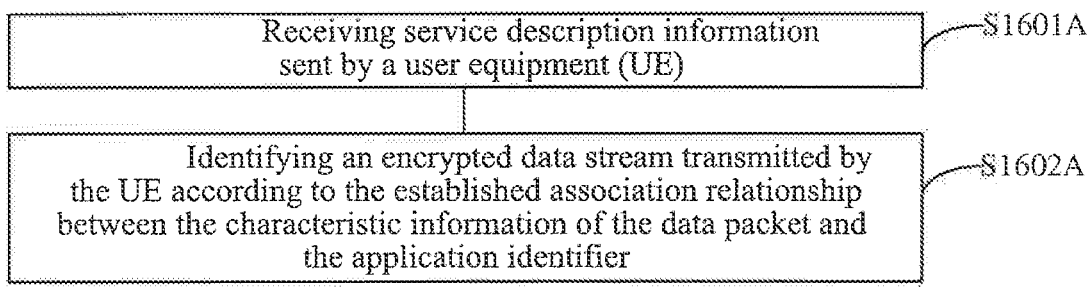
FIG. 16A is a schematic diagram of yet another method for identifying an encrypted data stream according to an embodiment of the present disclosure.

Based on the same inventive concept of the foregoing embodiment, referring to FIG. 16A, FIG. 16A shows a method for identifying an encrypted data stream provided in an embodiment of the present disclosure, where the method can be applied to a core network device. It should be noted that the core network device can include a control plane, such as a session management function SMF, and a user plane, such as a user plane function UPF. The method includes:

S1601A: receiving service description information sent by a user equipment (UE);

where the service description information includes an application identifier and/or data stream description information; the data stream description information includes at least one of: an IP source address, an IP source port number, an IP destination address, an IP destination port number, a MAC source address, a MAC source port number, a MAC destination address, a MAC destination port number, a protocol type and a VLAN label.

It can be understood that since the data stream description information may include not only layer-3 characteristics but also an association relationship between layer-2 characteristics and the application identifier, it can be known that when the UE transmits through a non-IP data packet, the UE can still identify an encrypted data stream of an application.

S1602A: Identifying an encrypted data stream transmitted by the UE according to the established association relationship between the characteristic information of the data packet and the application identifier.

For the technical solution shown in FIG. 16A, in a possible implementation, the receiving service description information sent by a user equipment (UE) includes that:

the control plane of the core network device receives a control plane non-access stratum (NAS) message which is sent by the UE and includes the service description information.

For the technical solution shown in FIG. 16A, in a possible implementation, the receiving service description information sent by a user equipment (UE) includes that: the user plane of the core network device receives a user plane data packet including the service description information.

In the above implementation, a PDCP header and/or a GTP-U header of the user plane data packet includes the service description information; or, an IPV4 or IPV6 header of the user plane data packet includes the service description information; or, a header of the user plane data packet for tunnel encapsulation includes the service description information.

For the technical solution shown in FIG. 16A, based on the above two implementations, before identifying the encrypted data stream transmitted by the UE according to the established association relationship between the characteristic information of the data packet and the application identifier, the method further includes: determining that the service description information is credible.

Specifically, the determining that the service description information is credible includes:

receiving authentication information sent by the UE; where the authentication information includes an authentication parameter and a first authentication result; Obtaining a second authentication result according to the authentication parameter; and when the first authentication result is the same as the second authentication result, determining that the service description information is credible.

It should be noted that the authentication parameter in the authentication information may include the random number and the public key Ka described in the foregoing embodiments; or may include the random number, the public key Ka, and the application identifier Application ID. An authentication result Token can be generated by the authentication parameter in combination with a preset authentication algorithm. Taking the HASH algorithm as an example, the authentication result Token=HASH (Ka, random number) or the authentication result Token=HASH (Ka, random number, application identifier) may be obtained.

In the above authentication parameters, the Ka is an optional authentication parameter. The Ka may also be searched in a core network database by the core network device through the application identifier, and a correspondence between the application identifier and the Ka in the core network database may be pre-configured in the database by a third party server.

When the second authentication result Token2 calculated by the core network device is the same as the first authentication result Token1, it can be indicated that the service description information sent by the UE is credible.

In detail, if it is determined according to the above authentication process that the NAS message which is sent by the UE and carries the service description information is credible, this credible status can be applicable to NAS messages subsequently sent by the UE. For example, when the authentication parameter does not include the application identifier Application ID and the authentication is passed, the core network device can believe that all service description messages included in NAS messages subsequently sent by the UE are in a credible status; when the authentication parameter includes the application identifier Application ID and the authentication is passed, the core network device can believe that service description information which is included in NAS messages subsequently sent by the UE and corresponds to the application identifier Application ID is in a credible status.

It should be further noted that, in the specific implementation process, the UE can carry the authentication information and the service description information in the same NAS message or user plane data packet and send the same to the core network device, so that the core network device can receive the service description information and the authentication information at the same time.

It can be understood that, in addition to the authentication method described in this embodiment, the service description information sent by the UE may also be determined to be credible by other authentication methods, which will not be described in this embodiment.

For the technical solution shown in FIG. 16A, in a possible implementation, the identifying an encrypted data stream transmitted by the UE according to the established association relationship between the characteristic information of the data packet and the application identifier includes that: the control plane of the core network device interactively establishes a filter (filter) for detecting the encrypted data stream of the UE with the user plane of the core network device according to the service description information.

It should be noted that, with reference to the foregoing embodiments, after it is determined that the service description information is credible by the above authentication method, the control plane of the core network device can send the authentication result to the user plane of the core network device, so that the user plane can establish the association relationship between the application identifier and the characteristic information of the data packet, and establish the filter (filter) for detecting the encrypted data stream of the UE based on the association relationship.

After the filter is established, the core network device cannot perform authentication on data sent by the UE, but can directly use the filter to identify the encrypted data stream. Referring to the foregoing embodiments, there can be a corresponding life cycle when authentication is not performed on the data sent by the UE, for which the effective time message described in the foregoing embodiments may be referred to specifically, which is not described in detail in this embodiment.

Figure 16B:
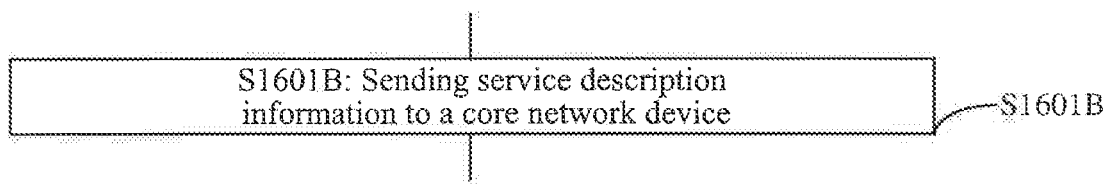
FIG. 16B is a schematic diagram of yet another method for identifying an encrypted data stream according to an embodiment of the present disclosure.

Corresponding to the technical solution described in FIG. 16A and referring to FIG. 16B, FIG. 16B shows a method for identifying an encrypted data stream, which is applied to a UE, according to an embodiment of the present disclosure. The method can include:

S1601B: sending service description information to a core network device;

where the service description information includes an application identifier and/or data stream description information; the data stream description information includes at least one of: an IP source address, an IP source port number, an IP destination address, an IP destination port number, a MAC source address, a MAC source port number, a MAC destination address, a MAC destination port number, a protocol type, and a VLAN label.

For the technical solution shown in FIG. 16B, in a possible implementation, the sending service description information to a core network device includes:

carrying the service description information in a control plane non-access stratum (NAS) message and sending the same to the core network device.

For the technical solution shown in FIG. 16B, in a possible implementation, the sending service description information to a core network device includes:

carrying the service description information in a user plane data packet; and sending the user plane data packet carrying the service description information to the core network device.

In the foregoing implementation, the carrying the service description information in a user plane data packet includes:

adding the service description information in a PDCP header and/or a GTP-U header of the user plane data packet; or, adding the service description information in an IPV4 or IPV6 header of the user plane data packet; or, adding the service description information in a header of the user plane data packet for tunnel encapsulation.

For the technical solution shown in FIG. 16B, in a possible implementation, the method further includes: sending authentication information to the core network device; where the authentication information includes an authentication parameter and a first authentication result.

It can be understood that the UE can carry the authentication information and the service description information in the same NAS message or user plane data packet and send the same to the core network device, so that the core network device can receive the authentication information and the service description information at the same time.

For the specific authentication information, please refer to the description for the technical solution shown in FIG. 16A, and details are not described here again. After receiving the authentication information, the core network device can perform authentication according to the description for the technical solution shown in FIG. 16A, and determines after the authentication is successful that the service description information sent by the UE is credible.

Figure 17A:
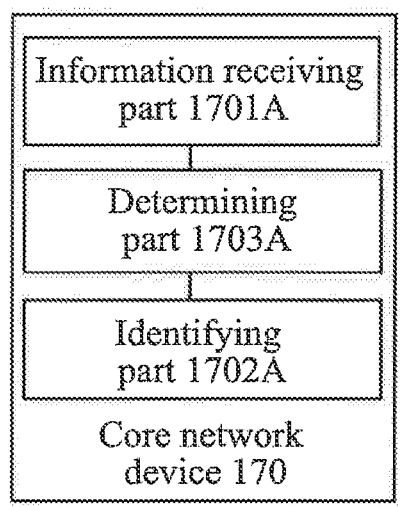
FIG. 17A is a schematic structural diagram of yet another core network device according to an embodiment of the present disclosure.

Based on the technical solution shown in FIG. 16A and referring to FIG. 17A, FIG. 17A shows a structure of yet another core network device 170 provided in an embodiment of the present disclosure, including: an information receiving part 1701A and an identifying part 1702A; where, the information receiving part 1701A is configured to receive service description information sent by a user equipment (UE); where the service description information includes an application identifier and/or data stream description information; the data stream description information includes at least one of: an IP source address, an IP source port number, an IP destination address, an IP destination port number, a MAC source address, a MAC source port number, a MAC destination address, a MAC destination port number, a protocol type and a VLAN label; and the identifying part 1702A is configured to identify an encrypted data stream transmitted by the UE according to an established association relationship between characteristic information of a data packet and the application identifier.

In the above solution, the information receiving part 1701A is configured to:

receive, by the control plane of the core network device, a control plane non-access stratum (NAS) message which is sent by the UE and includes the service description information.

In the above solution, the information receiving part 1701A is configured to:

receive, by a user plane of the core network device, a user plane data packet including service description information.

In the above solution, a PDCP header and/or a GTP-U header of the user plane data packet includes the service description information; or, an IPV4 or IPV6 header of the user plane data packet includes the service description information; or, a header of the user plane data packet for tunnel encapsulation includes the service description information.

In the above solution, referring to FIG. 17A, the core network device 170 can further include a determining part 1703A configured to: determine whether the service description information is credible, and trigger the identifying part 1702A after it is determined that the service description information is credible.

Specifically; the determining part 1703A is configured to:

receive authentication information sent by the UE; where the authentication information includes an authentication parameter and a first authentication result;

obtain a second authentication result according to the authentication parameter; and determine that the service description information is credible when the first authentication result is the same as the second authentication result.

In the above solution, the identifying part 1702A is configured to:

after the service description information is determined to be credible, interactively establishing, by the control plane of the core network device, a filter (filter) for detecting the encrypted data stream of the UE with the user plane of the core network device according to the service description information.

Furthermore, this embodiment further provides a computer readable medium, having a program for identifying an encrypted data stream stored thereon, where the program for identifying an encrypted data stream implements the steps of the method described in FIG. 16A when executed by at least one processor. For specific description of the computer readable medium, please refer to the description in Embodiment 4, which is not repeated here.

Figure 17B:
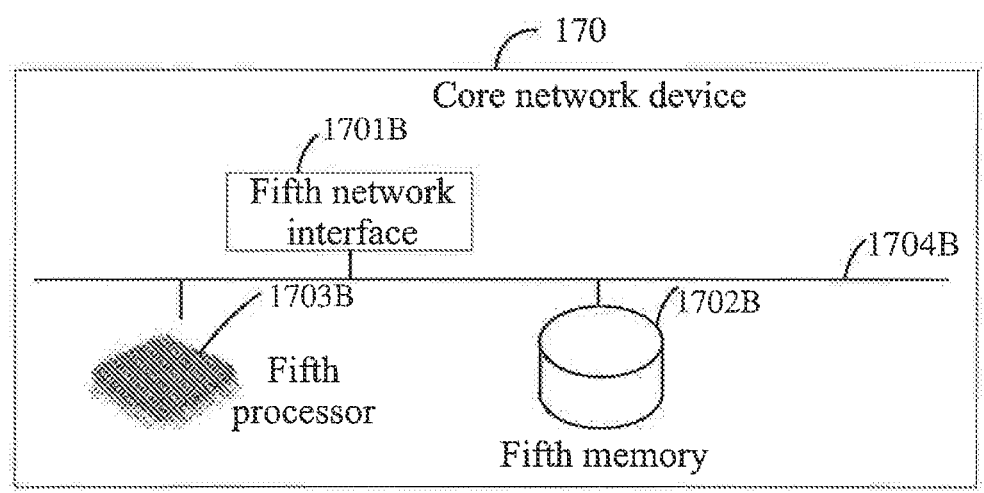
FIG. 17B is a schematic structural diagram of yet another user equipment according to an embodiment of the present disclosure.

Based on the core network device 170 and the computer readable medium and referring to FIG. 17B, a specific hardware structure of the core network device 170 provided in an embodiment of the present disclosure is shown, which can include: a fifth network interface 1701B, a fifth memory 1702B, and a fifth processor 1703B; the various components are coupled together by a bus system 1704B. It can be understood that the bus system 1704B is configured to enable connective communication among the components. The bus system 1704B includes a power bus, a control bus, and a status signal bus in addition to a data bus. For clarity of illustration, however, the various buses are labeled in FIG. 17B as the bus system 1704B.

The fifth network interface 1701B is configured to receive and send signals in a process of receiving and sending information with other external network elements;

the fifth memory 1702B is configured to store a computer program operable on the fifth processor 1703B;

the fifth processor 1703B is configured to execute the steps of the method of FIG. 16A when running the computer program.

Figure 18A:
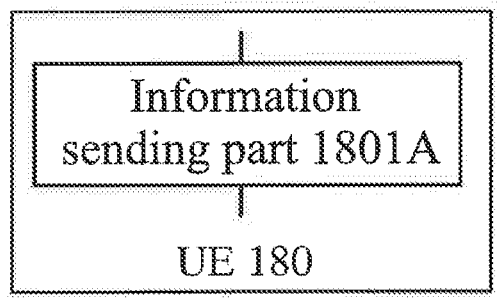
FIG. 18A is a schematic diagram of a hardware structure of yet another core network device according to an embodiment of the present disclosure.

Based on the solution shown in FIG. 16B and referring to FIG. 18A, a structure of a UE 180 provided in an embodiment of the present disclosure is shown, including: an information sending part 1801A configured to send service description information to a core network device; where the service description information includes an application identifier and/or data stream description information; the data stream description information includes at least one of: an IP source address, an IP source port number, an IP destination address, an IP destination port number, a MAC source address, a MAC source port number, a MAC destination address, a MAC destination port number, a protocol type, and a VLAN label.

In the above solution, the information sending part 1801A is configured to: carry the service description information in a control plane non-access stratum (NAS) message and send the message to the core network device.

In the above solution, the information sending part 1801A is configured to: carry the service description information in a user plane data packet; and send the user plane data packet carrying the service description information to the core network device.

In the above solution, the information sending part 1801A is configured to: add the service description information in a PDCP header and/or a GTP-U header of the user plane data packet; or, add the service description information in an IPV4 or IPV6 header of the user plane data packet; or, add the service description information in a header of the user plane data packet for tunnel encapsulation.

In the above solution, the information sending part 1801A is further configured to: send authentication information to the core network device; where the authentication information includes an authentication parameter and a first authentication result.

Furthermore, this embodiment also provides a computer readable medium, having a program for identifying an encrypted data stream stored thereon, where the program for identifying an encrypted data stream implements the steps of the method described in FIG. 16B when executed by at least one processor. For specific description of the computer readable medium, please refer to the description in Embodiment 4, which is not repeated here.

Figure 18B:
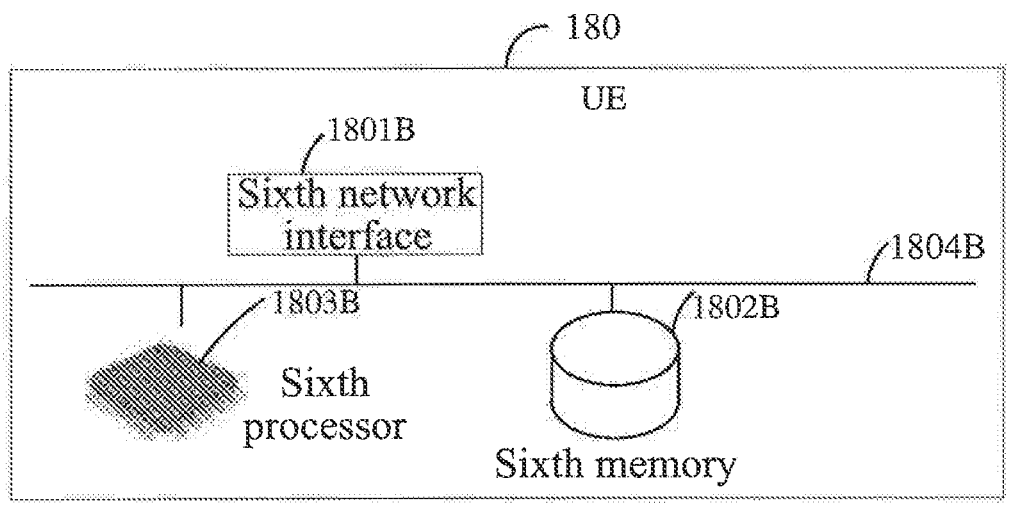
FIG. 18B is a schematic diagram of a hardware structure of yet another user equipment according to an embodiment of the present disclosure.

Based on the UE 180 and the computer readable medium and referring to FIG. 18B, a specific hardware structure of the UE 180 provided in an embodiment of the present disclosure is shown, which can include: a sixth network interface 1801B, a sixth memory 1802B, and a sixth processor 1803B; the various components are coupled together by a bus system 1804B. It can be understood that the bus system 1804B is configured to enable connective communication among the components. The bus system 1804B includes a power bus, a control bus, and a status signal bus in addition to a data bus. For clarity of illustration, however, the various buses are labeled in FIG. 18B as the bus system 1804B.

The sixth network interface 1801B is configured to receive and send signals in a process of receiving and sending information with another external network elements;

the sixth memory 1802B is configured to store a computer program operable on the sixth processor 1803B;

the sixth processor 1803B is configured to execute the steps of the method described in FIG. 16B when running the computer program.

Embodiment 9

Figure 19:
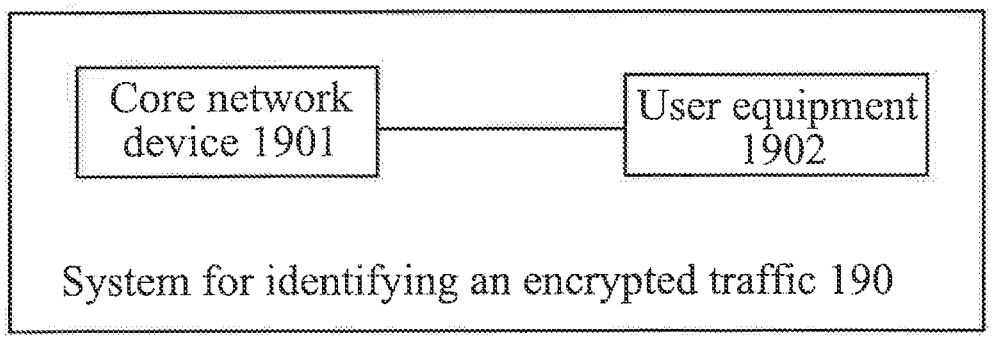
FIG. 19 is a schematic structural diagram of a system for identifying an encrypted traffic according to an embodiment of the present disclosure.

Based on the same inventive concept as the foregoing embodiments and referring to FIG. 19, FIG. 19 shows a structure of a system 190 for identifying an encrypted traffic according to an embodiment of the present disclosure, which includes a core network device 1901 and a user equipment 1902, where, In an implementation, the core network device 1901 is the core network device according to any of the foregoing embodiments; in an implementation, the user equipment 1902 may be the user equipment according to any of the foregoing embodiments.

The above descriptions are only preferred embodiments of the present disclosure, but are not intended to limit the scope of the present disclosure.

INDUSTRIAL APPLICABILITY

In the embodiments, the core network device performs authentication with the UE in the TLS handshake process of the UE and the OTT server or after the handshake is completed, and thus the association relationship for identifying the encrypted data stream is established to realize the detection and the statistics of the encrypted data stream. There is no need to rely on the plaintext identifier, and no complicated IP address configuration and maintenance are required, thereby improving the safety and reducing the computing resources required for the configuration and maintenance.

What is claimed is:

1. A method for identifying an encrypted data stream, wherein the method is applied to a core network device, and the method comprises:

receiving a data packet carrying authentication data sent by a user equipment (UE); wherein the authentication data comprises a first authentication parameter, a first authentication result and an application identifier;

obtaining, based on the first authentication parameter and a second authentication parameter, a second authentication result according to a set authentication algorithm; wherein the second authentication parameter is a pre-stored authentication parameter corresponding to the application identifier; and establishing an association relationship between characteristic information of the data packet and the application identifier when the second authentication result is consistent with the first authentication result in comparison; wherein the association relationship is used for subsequently identifying an encrypted data stream which is sent by the UE and corresponds to the application identifier; the characteristic information of the data packet comprises at least one or more of: an Internet protocol (IP) source address, an IP source port number, an IP destination address, an IP destination port number, a media access control (MAC) source address, an IP source port number, a MAC destination address, a MAC destination port number, a protocol type, and a virtual local area network (VLAN) label.

2. The method according to claim 1, wherein the receiving a data packet carrying authentication data sent by a UE comprises:

receiving, by a user plane of the core network device, a first transport layer security protocol (TLS) handshake request sent by the UE in a TLS handshake process established by an application layer session; wherein the authentication data is carried in a plaintext field of the first TLS handshake request.

3. The method according to claim 2, wherein after receiving a data packet carrying authentication data sent by a UE, the method further comprises:

transmitting, by the user plane of the core network device, the authentication data to a control plane of the core network device after detecting the authentication data from the plaintext field of the first TLS handshake request.

4. The method according to claim 1, wherein the receiving a data packet carrying authentication data sent by a UE comprises:

receiving, by a user plane of the core network device, an authentication request sent by the UE through a base station after a TLS handshake is completed; wherein the authentication data is carried in an extended general packet radio service tunnelling protocol user plane (GTP-U) field of the authentication request.

5. The method according to claim 1, wherein the receiving a data packet carrying authentication data sent by a UE comprises:

receiving, by a control plane of the core network device, a non-access stratum session management (NAS-SM) message sent by the UE after a TLS handshake is completed; wherein an extended field of the NAS-SM message comprises: a first authentication parameter, a first authentication result, an application identifier and characteristic information of the NAS-SM message; wherein the first authentication parameter comprises: a random number and a public key Ka; the characteristic information of the NAS-SM message comprises an IP address, a port number, a protocol type of an over the top (OTT) server and a MAC address of the OTT server.

6. The method according to claim 5, wherein the obtaining, based on the first authentication parameter and a second authentication parameter, a second authentication result according to a set authentication algorithm comprises:

obtaining, by the control plane of the core network device, the second authentication result according to the set authentication algorithm based on the random number in the first authentication parameter and a public key in the second authentication parameter.

7. The method according to claim 5, wherein the establishing an association relationship between characteristic information of the data packet and the application identifier when the second authentication result is consistent with the first authentication result in comparison comprises:

when the second authentication result is consistent with the first authentication result in comparison, generating, by the control plane of the core network device, the characteristic information of the data packet according to characteristic information of the OTT server and characteristic information of the UE, and transmitting the generated characteristic information of the data packet and the application identifier to a user plane of the core network device; wherein the characteristic information of the UE comprises: an IP address, a port and a MAC address of the UE; and establishing, by the user plane of the core network device, the association relationship between the characteristic information of the data packet and the application identifier.

8. The method according to claim 1, wherein after obtaining, based on the first authentication parameter and a second authentication parameter, a second authentication result according to a set authentication algorithm, the method further comprises:

sending, by a control plane of the core network device, a comparison result of the second authentication result and the first authentication result to the UE through a user plane of the core network device.

9. The method according to claim 1, wherein the method further comprises:

receiving an effective time message sent by the UE; wherein the effective time message is used for indicating an effective duration of the association relationship for identifying the encrypted data stream.

10. The method according to claim 9, wherein the method further comprises:

when the effective duration expires, releasing the association relationship if encrypted data stream transmission is not completed.

11. The method according to claim 10, wherein the method further comprises:

receiving a release indication message sent by the UE within the effective duration or after the effective duration expires; and releasing the association relationship based on the release indication message.

12. A core network device, comprising: a network interface, a memory and a processor, the memory is configured to store a computer program operable on the processor; and the processor is configured to:

receive, through the network interface, an effective time message sent by a user equipment (UE) after an association relationship between characteristic information of a data packet and an application identifier is established; wherein the effective time message is used for indicating an effective duration of the association relationship for identifying an encrypted data stream;

perform, within the effective duration, encrypted data stream transmission with the UE based on the association relationship;

receive, through the network interface, a release indication message sent by the UE; and release the association relationship based on the release indication message.

13. The core network device according to claim 12, wherein the processor is further configured to: release the association relationship after the effective duration expires; or continue the encrypted data stream transmission with the UE after the effective duration expires, and release the association relationship after the encrypted data stream transmission is completed.

14. A user equipment (UE), wherein the UE comprises: a network interface, a memory and a processor, the memory is configured to store a computer program operable on the processor; and the processor is configured to:

send, through the network interface, a data packet carrying authentication data;

wherein the authentication data is used for a core network device to perform authentication, and the authentication data comprises: a first authentication parameter, a first authentication result and an application identifier; and send, through the network interface, an effective time message to the core network device; wherein the effective time message is used for indicating an effective duration of an association relationship between characteristic information of the data packet and the application identifier for identifying an encrypted data stream.

15. The UE according to claim 14, wherein the processor is further configured to: carry the authentication data in a plaintext field of a first transport layer security protocol (TLS) handshake request in a TLS handshake process established by an application layer session; and perform transparent transmission on the first TLS handshake request carrying the authentication data to a control plane of the core network device through a user plane of the core network device.

16. The UE according to claim 14, wherein the processor is further configured to: send, through the network interface, an authentication request carrying the authentication data in an extended packet data convergence protocol (PDCP) field to a base station after a TLS handshake is completed, convert, through the base station, the authentication data in the extended PDCP field into an extended general packet radio service tunnelling protocol user plane (GTP-U) field and continue to send the authentication request to a user plane of the core network device.

17. The UE according to claim 14, wherein the processor is further configured to: send, through the network interface, a non-access stratum session management (NAS-SM) message to a control plane of the core network device after a TLS handshake is completed; wherein an extended field of the NAS-SM message comprises: a first authentication parameter, a first authentication result, an application identifier and a characteristic message of the NAS-SM message; wherein the first authentication parameter comprises: a random number and a public key Ka; the characteristic information of the NAS-SM message comprises an IP address, a port number, a protocol type of an over the top (OTT) server and a MAC address of the OTT server.

18. The UE according to claim 14, wherein the processor is further configured to: receive, through the network interface, an authentication result returned by a control plane of the core network device.

19. The UE according to claim 14, wherein the processor is further configured to send, through the network interface, a release indication message to the core network device; wherein the release indication message is used for releasing an association relationship.

* * * * *